(12) United States Patent
Kim et al.

(10) Patent No.: US 11,782,853 B2
(45) Date of Patent: Oct. 10, 2023

(54) STORAGE DEVICE ADJUSTING DATA RATE AND STORAGE SYSTEM INCLUDING THE SAME

(71) Applicant: Samsung Electronics Co., Ltd., Suwon-si (KR)

(72) Inventors: Jeongsu Kim, Suwon-si (KR); Kwanwoo Noh, Seoul (KR); Sungho Seo, Suwon-si (KR); Yongwoo Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 109 days.

(21) Appl. No.: 17/467,929

(22) Filed: Sep. 7, 2021

(65) Prior Publication Data

US 2022/0206966 A1 Jun. 30, 2022

(30) Foreign Application Priority Data

Dec. 28, 2020 (KR) .................. 10-2020-0185209

(51) Int. Cl.
*G06F 13/16* (2006.01)
*H04L 7/00* (2006.01)
*G06F 1/12* (2006.01)
*G06F 13/40* (2006.01)
*H04L 1/00* (2006.01)

(52) U.S. Cl.
CPC .......... *G06F 13/1668* (2013.01); *G06F 1/12* (2013.01); *G06F 13/4027* (2013.01); *H04L 1/0002* (2013.01); *H04L 7/0008* (2013.01)

(58) Field of Classification Search
CPC .... G06F 13/1668; G06F 1/12; G06F 13/4027; H04L 1/0002; H04L 7/0008
See application file for complete search history.

(56) References Cited

U.S. PATENT DOCUMENTS

| | | | |
|---|---|---|---|
| 7,925,799 B2 * | 4/2011 | Komori | G06F 3/0653 709/200 |
| 9,086,966 B2 | 7/2015 | Wagh et al. | |
| 9,477,620 B2 | 10/2016 | Kim et al. | |
| 9,753,529 B2 | 9/2017 | Wagh et al. | |
| 2004/0073719 A1 * | 4/2004 | Grimsrud | G06F 3/0613 710/1 |
| 2011/0138096 A1 | 6/2011 | Radulescu et al. | |
| 2014/0226708 A1 | 8/2014 | Yang | |
| 2015/0032913 A1 * | 1/2015 | Kim | G06F 13/4291 710/24 |
| 2015/0032915 A1 * | 1/2015 | Hur | G06F 3/0625 710/29 |
| 2016/0036684 A1 | 2/2016 | Jones et al. | |

\* cited by examiner

*Primary Examiner* — Nimesh G Patel
(74) *Attorney, Agent, or Firm* — Harness, Dickey & Pierce, P.L.C.

(57) ABSTRACT

A method of operating a storage device includes receiving a first bit sequence including a request for changing a data rate from a host according to a first data rate through an input signal pin; sending a second bit sequence including a response to the request for changing a data rate to the host at the first data rate through an output signal pin; and changing the data rate to a second data rate according to whether a tail-of-burst (TOB) indicating an end of the second bit sequence is output.

20 Claims, 19 Drawing Sheets

STORAGE DEVICE ADJUSTING DATA RATE AND STORAGE SYSTEM INCLUDING THE SAME

CROSS-REFERENCE TO RELATED APPLICATION

This application is based on and claims priority under 35 U.S.C. § 119 to Korean Patent Application No. 10-2020-0185209, filed on Dec. 28, 2020, in the Korean Intellectual Property Office, the disclosure of which is incorporated by reference herein in its entirety.

BACKGROUND

The inventive concepts relate to a storage device, and more particularly, to a storage device adjusting a data rate and a storage system including the same.

A storage system includes a host and a storage device. The host and the storage device are connected to each other through various standard interfaces like universal flash storage (UFS), serial ATA (SATA), small computer small interface (SCSI), serial attached SCSI (SAS), embedded MMC (eMMC), etc. When a storage system is used in a mobile device, a high speed operation between a host and a storage device may be important, and a more rapid change of a data rate may be desired.

SUMMARY

The inventive concepts provide a storage device capable of adjusting a data rate while maintaining a high-speed mode, a method of operating the storage device, and a storage system including the storage device.

According to an aspect of the inventive concepts, there is provided a method of operating a storage device, the method including receiving a first bit sequence including a request for changing a data rate from a host at a first data rate through an input signal pin; sending a second bit sequence including a response to the request for changing a data rate to the host at the first data rate through an output signal pin; and changing the data rate to a second data rate according to whether a final bit indicating an end of the second bit sequence is output.

According to another aspect of the inventive concepts, there is provided a method of operating a storage system including a host and a storage device, the method including sending, by the host, a first bit sequence including a request to change a data rate to the storage device at a first data rate; sending, by the storage device, a second bit sequence including a response corresponding to the request to change the data rate to the host at the first data rate; and changing, by the host and the storage device, the data rate based on a final bit indicating the end of the second bit sequence.

According to another aspect of the inventive concepts, there is provided a storage device including a non-volatile memory configured to store data received from a host; a device controller configured to control the non-volatile memory; and an interconnect connected to the host through a plurality of pins, wherein the interconnect is configured to receive a first bit sequence including a data rate change request from the host at a first data rate, is configured to send a second bit sequence including a response to the data rate change request to the host at the first data rate, and is configured to change the data rate to a second data rate according to whether a final bit indicating the end of the second bit sequence is output.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF EXAMPLE EMBODIMENTS

Figure 1:
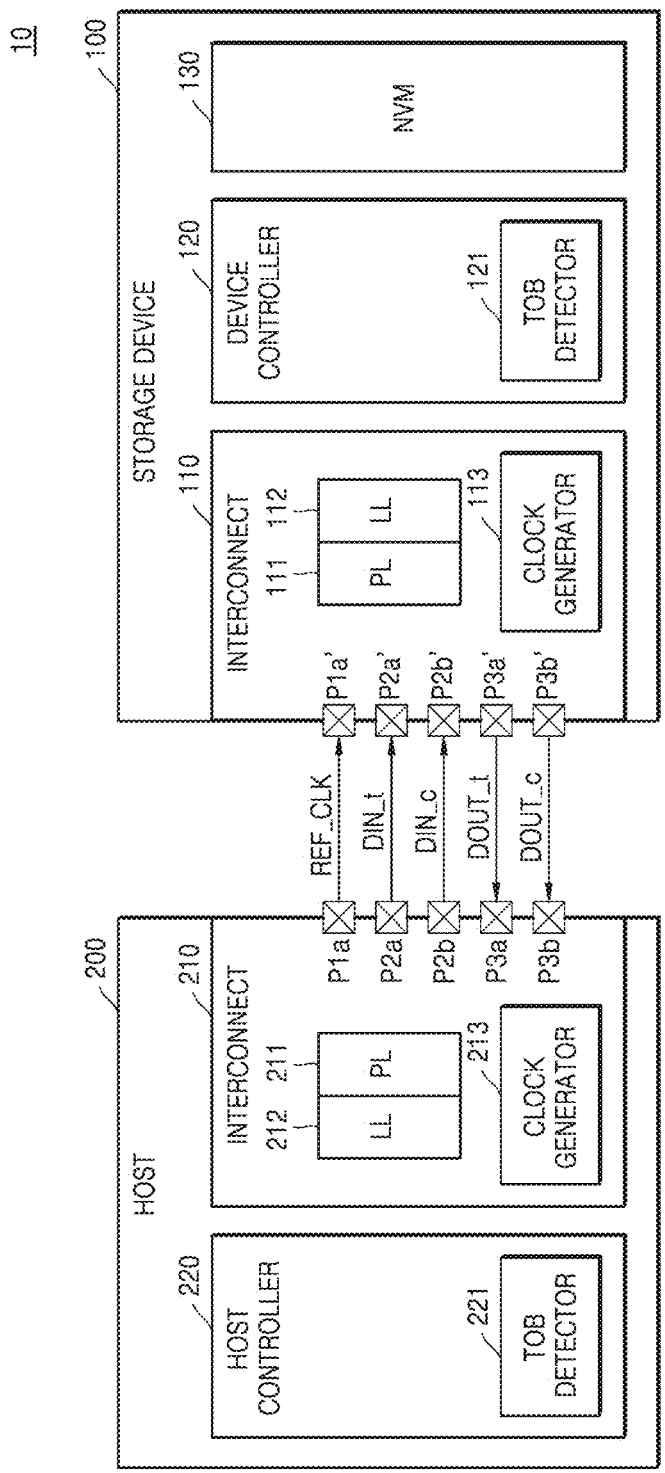
FIG. 1 is a block diagram showing a storage system according to an embodiment of the inventive concepts.

FIG. 1 is a block diagram showing a storage system according to an embodiment of the inventive concepts. Referring to FIG. 1, a storage system 10 includes a storage device 100 and a host 200. For example, the storage device 100 and the host 200 may be connected to each other according to an interface protocol defined in the universal flash storage (UFS) standard. Therefore, the storage device 100 may be a UFS device, and the host 200 may be a UFS host. However, the inventive concepts are not limited thereto, and the storage device 100 and the host 200 may be connected according to various standard interfaces.

The host 200 may include an interconnect 210 and/or a host controller 220. The host 200 may control a data processing operation for the storage device 100, e.g., a data read operation or a data write operation. The host 200 may refer to a data processing device capable of processing data, e.g., a central processing unit (CPU), a processor, a microprocessor, an application processor (AP), etc. The host 200 may execute an operating system (OS) and/or various applications. In an example embodiment, the storage system 10 may be included in a mobile device, and the host 200 may be implemented as an AP. In an example embodiment, the host 200 may be implemented as a system-on-a-chip (SOC), and thus the host 200 may be embedded in an electronic device.

The storage device 100 may include an interconnect 110, a device controller 120, and/or a non-volatile memory 130. The device controller 120 may control the non-volatile memory 130 to write data to the non-volatile memory 130 in response to a write request from the host 200 or may control the non-volatile memory 130 to read the data stored in the non-volatile memory 130 in response to a read request from the host 200. The non-volatile memory 130 may include a plurality of memory cells. For example, the memory cells may be flash memory cells. In an example embodiment, the memory cells may be NAND flash memory cells. However, the inventive concepts are not limited thereto, and, in other embodiments, the memory cells may be resistive memory cells like resistive RAM (ReRAM) cells, phase change RAM (PRAM) cells, and magnetic RAM (MRAM) cells.

Also, although FIG. 1 shows that the interconnect 110 and the device controller 120 as components distinguished from each other, the device controller 120 may include the interconnect 110, and this concept is also applied to the drawings described below other than FIG. 1. For example, when the device controller 120 is implemented as a package chip, the interconnect 110 may also be implemented together on the package chip.

The host 200 may include a first pin P1a, and the storage device 100 may include a first pin P1a' configured to be connected to the first pin P1a. First pins P1a and P1a ' may be referred to as clock signal pins. The storage device 100 may receive a reference clock signal REF_CLK from the host 200 through the first pin P1a_'.

The host 200 may include second pins P2a and P2b, and the storage device 100 may include second pins P2a' and P2b' configured to be connected to the second pins P2A and P2B, respectively. The storage device 100 may receive input signals, e.g., differential input signals DIN_t and DIN_c, from the host 200 through the second pins P2a' and P2b'. Therefore, the second pins P2a' and P2b' may be referred to as "input signal pins", and signal lines through which the differential input signals DIN_t and DIN_c are transmitted may constitute a receiving lane. For example, the second pin P2a' may be referred to as a "positive input signal pin", and the second pin P2b' may be referred to as a "negative input signal pin".

Also, the host 200 may further include third pins P3a and P3b, and the storage device 100 may further include third pins P3a' and P3b' configured to be connected to the third pins P3a and P3b, respectively. The storage device 100 may transmit output signals, e.g., differential output signals DOUT_t and DOUT_c, to the host 200 through the third pins P3a' and P3b'. Therefore, the third pins P3a' and P3b' may be referred to as "output signal pins", and signal lines through which differential output signals DOUT_t and DOUT_c are transmitted may constitute a transmitting lane. For example, the third pin P3a' may be referred to as a "positive output signal pin", and the third pin P3b' may be referred to as a "negative output signal pin".

The host 200 may include a clock generator 213. The clock generator 213 may generate a reference clock signal REF_CLK, and may generate an internal clock signal used for data transmission based on the reference clock signal REF_CLK. The clock generator 213 may adjust a data rate by changing the frequency of a reference clock signal or an internal clock signal. The clock generator 213 will be described in detail later with reference to FIG. 3.

The host 200 may further include a tail-of-burst (TOB) detector 221. Although FIG. 1 shows that the TOB detector 221 is included in the host controller 220, the inventive concepts are not limited thereto, and the TOB detector 221 may be included in the interconnect 210. The TOB detector 221 may detect the final bit of a bit sequence received through the third pins P3a and P3b. A bit sequence may be referred to as a burst, and the final bit may be referred to as a TOB. The host controller 220 may transmit a request for changing a power mode to the storage device 100. The request for changing a power mode may be referred to as a power mode change request PWR_req. The power mode may include a high-speed mode and a low-speed mode, and a plurality of data rates may be set for the high-speed mode and the low-speed mode. The host controller 220 may request a change of a data rate as well as a change between the high-speed mode and the low-speed mode through the power mode change request PWR_req. The host controller 220 may receive a response to the power mode change request PWR_req from the storage device 100. The response to the power mode change request PWR_req may be referred to as a power mode change response PWR_cnf. When the TOB of a burst including the power mode change response PWR_cnf is received, the host controller 220 may control the clock generator 213, such that the data rate is adjusted. The TOB of the burst including the power mode change response PWR_cnf may be detected by the TOB detector 221.

The storage device 100 may include a clock generator 113. The clock generator 113 may generate an internal clock signal used for data transmission based on the reference clock signal REF_CLK received through a clock signal pin P1a'. The clock generator 113 may adjust a data rate by changing the frequency of an internal clock signal. The clock generator 113 will be described in detail later with reference to FIG. 3.

The storage device 100 may further include a TOB detector 121. Although FIG. 1 shows that the TOB detector 121 is included in the device controller 120, the inventive concepts are not limited thereto, and the TOB detector 121 may be included in the interconnect 110. The TOB detector 121 may detect the TOB of a burst received through the second pins P2a' and P2b'. When the TOB of a burst including the power mode change request PWR_req is detected by the TOB detector 121, the interconnect 110 may transmit the TOB of the burst including the power mode change response PWR_cnf through the third pins P3a' and P3b'. When the TOB of a burst including the power mode change response PWR_cnf is transmitted, the interconnect 110 may control the clock generator 113, such that the data rate is adjusted.

Interconnects 110 and 210 may provide an interface for exchanging data between the host 200 and the storage device 100. In an example embodiment, the interconnect 110 may include a physical layer (PL) 111 and/or a link layer (LL) 112, and the PL 111 may be connected to first to third pins P1*a*', P2*a*', P2*b*', P3*a*', and/or P3*b*'. In the same regard, the interconnect 210 may also include a PL 211 and an LL 212, and the PL 211 may be connected to first to third pins P1*a*, P2*a*, P2*b*, P3*a*, and/or P3*b*. The PL 111 and 211 may each include physical components for exchanging data between the host 200 and the storage device 100, e.g., at least one transmitter and at least one receiver. A host transmitter HOST TX may be configured to include second pins P2*a* and P2*b*, and a host receiver HOST RX may be configured to include third pins P3*a* and P3*b*. A device transmitter DEVICE TX may be configured to include third pins P3*a*' and P3*b*', and a device receiver DEVICE RX may be configured to include second pins P2*a*' and P2*b*'. The LL 112 and 212 may each manage transmission and composition of data and may also manage integrity and errors of data.

A transmitter TX and a receiver RX may receive a reference clock signal from clock generators 213 and 113 and transmit and receive data according to the reference clock signal. The host 200 according to an example embodiment of the inventive concepts may reduce or prevent a situation in which an error occurs in data being transmitted by adjusting a data rate after the TOB of a burst is received from the storage device 100. Also, because the host 200 according to the example embodiment of the inventive concepts may drive the host transmitter HOST TX and the host receiver HOST RX by using one clock generator 213, the size of the storage system 10 may be reduced as compared to example embodiments where clock generators are respectively provided for the host transmitter HOST TX and the host receiver HOST RX.

The storage device 100 according to an example embodiment of the inventive concepts may reduce or prevent a situation in which an error occurs in data being transmitted by adjusting a data rate after the TOB of a burst is output to the host 200. Also, because the storage device 100 according to the example embodiment of the inventive concepts may drive the device transmitter DEVICE TX and the device receiver DEVICE RX by using one clock generator 113, the size of the storage system 10 may be reduced as compared to example embodiments where clock generators are respectively provided for the device transmitter DEVICE TX and the device receiver DEVICE RX.

In an example embodiment, when the storage system 10 is a mobile device, LLs 112 and 212 may be defined by the "UniPro" specification, and PLs 111 and 211 may be defined by the "M-PHY" specification. UniPro and the M-PHY are interface protocols proposed by the Mobile Industry Processor Interface (MIPI) Alliance. In an example embodiment, the LLs 112 and 212 may each include a physical adapted layer. The physical adapted layer may control PLs 111 and 211 to manage symbols of data or manage power.

In an example embodiment, the storage device 100 may be implemented as a DRAM-less device, and the DRAM-less device may refer to a device that does not include a DRAM cache. In an example embodiment, the device controller 120 may not include a DRAM controller. For example, the storage device 100 may use a partial region of the non-volatile memory 130 as a buffer memory.

In an example embodiment, the storage device 100 may be an internal memory embedded in an electronic device. For example, the storage device 100 may be an embedded UFS memory device, an embedded multi-media card (eMMC), or a solid state drive (SSD). However, the inventive concepts are not limited thereto, and the storage device 100 may include a non-volatile memory, e.g., one time programmable ROM (OTPROM), a programmable ROM (PROM), erasable and programmable ROM (EPROM), electrically erasable and programmable ROM (EEPROM), mask ROM, flash ROM, etc. In an example embodiment, the storage device 10 may be an external memory detachable from an electronic device. For example, the storage device 100 may include at least one of a UFS memory card, a compact flash (CF) card, a secure digital (SD) card, a micro secure digital (SD) card, a mini secure digital (SD) card, an extreme digital (xD) card, and a memory stick.

The storage system 10 may be implemented as an electronic device, e.g., a personal computer (PC), a laptop computer, a mobile phone, a smartphone, a tablet PC, a personal digital assistant (PDA), an enterprise digital assistant (EDA). a digital still camera, a digital video camera, an audio device, a portable multimedia player (PMP), a personal navigation device or portable navigation device (PND), an MP3 player, a handheld game console, an e-book terminal, etc. Also, the storage system 10 may be implemented as various types of electronic devices including wearable devices, e.g., a wrist watch or a head-mounted display (HMD).

Hereinafter, an interface between the host 200 and the storage device 100 will be described in detail with reference to FIG. 2.

Figure 2:
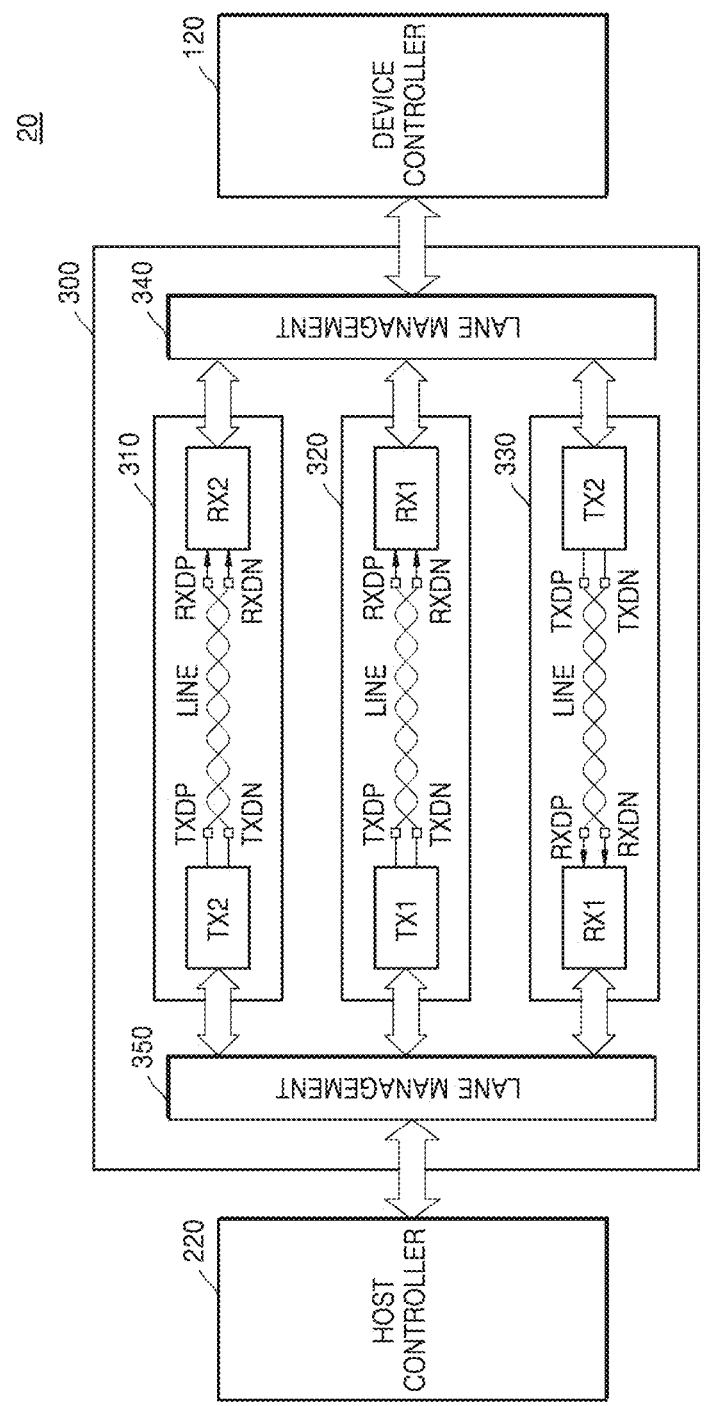
FIG. 2 is a diagram showing an interface between a host and a storage device according to an example embodiment of the inventive concepts.

FIG. 2 is a diagram showing an interface 20 between a host and a storage device according to an example embodiment of the inventive concepts.

Referring to FIG. 2, the interface 20 may include a link 300 between the host controller 220 and the device controller 120, wherein the link 300 may include a plurality of lanes 310, 320, and/or 330. The link 300 may include at least one lane corresponding to each direction, and the number of lanes in each direction may not necessarily be symmetric. For example, the link 300 may include two lanes 310 and 320 corresponding to a first direction from the host controller 220 to the device controller 120 and one lane 330 corresponding to a second direction from the device controller 120 to the host controller 220, but the inventive concepts are not limited thereto. For example, the two lanes 310 and 320 corresponding to the first direction may constitute a first sub-link, and the one lane 330 corresponding to the second direction may constitute a second sub-link.

The interface 20 may support a plurality of lanes. The lanes 310, 320, and/or 330 are unidirectional, single-signal, and transmission channels for transmitting information. For example, a lane 320 may include a transmitter TX1, a receiver RX1, and a line LINE for point-to-point interconnection between the transmitter TX1 and the receiver RX1. For example, the transmitter TX1 may be connected to a pin TXDP corresponding to a positive node of a differential signal and a pin TXDN corresponding to a negative node of the differential signal, whereas the receiver RX1 may be connected to a pin RXDP corresponding to the positive node of the differential signal and a pin RXDN corresponding to the negative node of the differential signal. The line LINE includes two differentially routed wires for respectively connecting pins TXDP and RXDP and pins TXDN and RXDN of the transmitter TX1 and the receiver RX1, wherein the wires may correspond to transmission lines.

The link 300 may further include lane managements 340 and 350 that provide bidirectional data transmission function. Although FIG. 2 shows that a lane management 350 and the host controller 220 are separated from each other, the inventive concepts are not limited thereto, and the lane management 350 may be included in the host controller 220. In the same regard, although FIG. 2 shows that a lane management 340 and the device controller 120 are separated from each other, the inventive concepts are not limited thereto, and the lane management 340 may be included in the device controller 120.

Referring to FIGS. 1 and 2 together, a transmitter included in the interconnect 210 of the host 200 and a receiver included in the interconnect 110 of the storage device 100 constitute one lane. However, the numbers of transmitters and receivers included in the interconnect 210 of the host 200 may be different from the numbers of transmitters and receivers included in the interconnect 110 of the storage device 100. Also, the capability of the host 200 may be different from that of the storage device 100. Therefore, the host 200 and the storage device 100 perform a process for recognizing a lane that is physically connected therebetween and receiving information from each other. Therefore, the host 200 and the storage device 100 perform a link startup process before exchanging data. By performing the link startup process, the host 200 and the storage device 100 may exchange and recognize information regarding the numbers of transmitters and receivers, information regarding physically connected lanes, and information regarding capability of each other. After the link startup process is completed, the host 200 and the storage device 100 are set to a linked-up state capable of more stably exchanging data with each other. The link startup process may be performed during an initialization operation performed when the storage system 10 is used for the first time or during a boot operation of the storage system 10. Furthermore, the link startup process may be performed during an operation of recovering an error in the linked-up state. The link startup process may be described in detail later with reference to FIG. 4.

Figure 3:
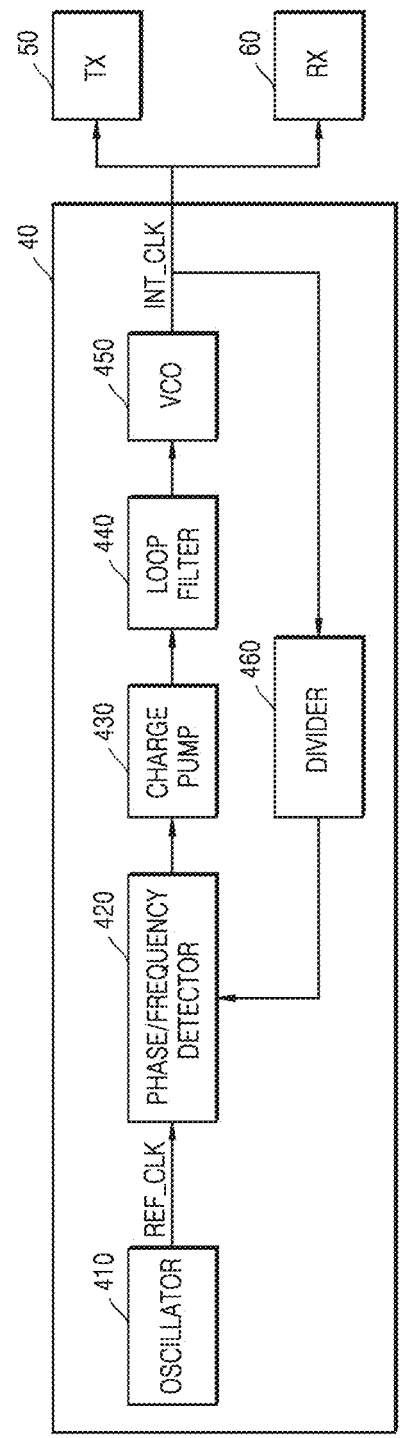
FIG. 3 is a block diagram showing a clock generator according to an example embodiment of the inventive concepts.

FIG. 3 is a block diagram showing a clock generator according to an example embodiment of the inventive concepts. A clock generator 40 may be an example of an implementation of the clock generator 213 or 113 of FIG. 1. The clock generator 40 may be a phase locked loop circuit. When the clock generator 40 is an example implementation of the clock generator 113 included in the storage device 100, an oscillator 410 that generates the reference clock signal REF_CLK may be omitted, and it may be understood that the reference clock signal REF_CLK is received from the host 200.

The clock generator 40 may generate an internal clock signal INT_CLK based on the reference clock signal REF_CLK. A transmitter (TX) 50 and a receiver (RX) 60 may transmit/receive data in synchronization with the internal clock signal INT_CLK. The TX 50 and the RX 60 may be examples of the transmitter TX and the receiver RX shown in FIG. 2. The clock generator 40 may include the oscillator 410, a phase/frequency detector 420, a charge pump 430, a loop filter 440, a voltage controlled oscillator (VCO) 450, and/or a divider 460.

The oscillator 410 may generate the reference clock signal REF_CLK having a constant frequency regardless of variations in a process, a voltage, and a temperature. For example, the frequency of the reference clock signal REF_CLK may be one of four values of 19.2 MHz, 26 MHz, 38.4 MHz, and 52 MHz, but is not limited thereto.

The phase/frequency detector 420 may compare the reference clock signal REF_CLK with a feedback signal received from the divider 460 and output a signal indicating a phase difference between the reference clock signal REF_CLK and the feedback signal based on a result of the comparison.

The charge pump 430 may store or discharge charges based on a signal received from the phase/frequency detector 420. The loop filter 440 may serve as a low pass filter to remove a noise frequency.

The VCO 450 may control the frequency of the internal clock signal INT_CLK based on a voltage received from the loop filter 440. For example, the VCO 450 may increase the frequency of the internal clock signal INT_CLK by receiving a positive voltage. The VCO 450 may decrease the frequency of the internal clock signal INT_CLK by receiving a negative voltage.

The divider 460 may count the internal clock signal INT_CLK according to a division ratio and provide a counted signal to the phase/frequency detector 420 as a feedback signal. Although FIG. 3 shows one divider 460, the clock generator 400 may include a plurality of dividers having different division ratios.

As will be described later with reference to the drawings, a storage system according to an embodiment of the inventive concepts may adjust a data rate by changing the frequency of an internal clock signal. To change the frequency of an internal clock signal, a division ratio of the divider 460 may be changed or the frequency of the reference clock signal REF_CLK may be changed.

A storage system according to an example embodiment of the inventive concepts may drive the transmitter TX and the receiver RX by using one clock generator 40. Therefore, as compared to example embodiments where a clock generator is provided for each of the transmitter TX and the receiver RX, the size of a host and a storage device may be reduced.

Figure 4:
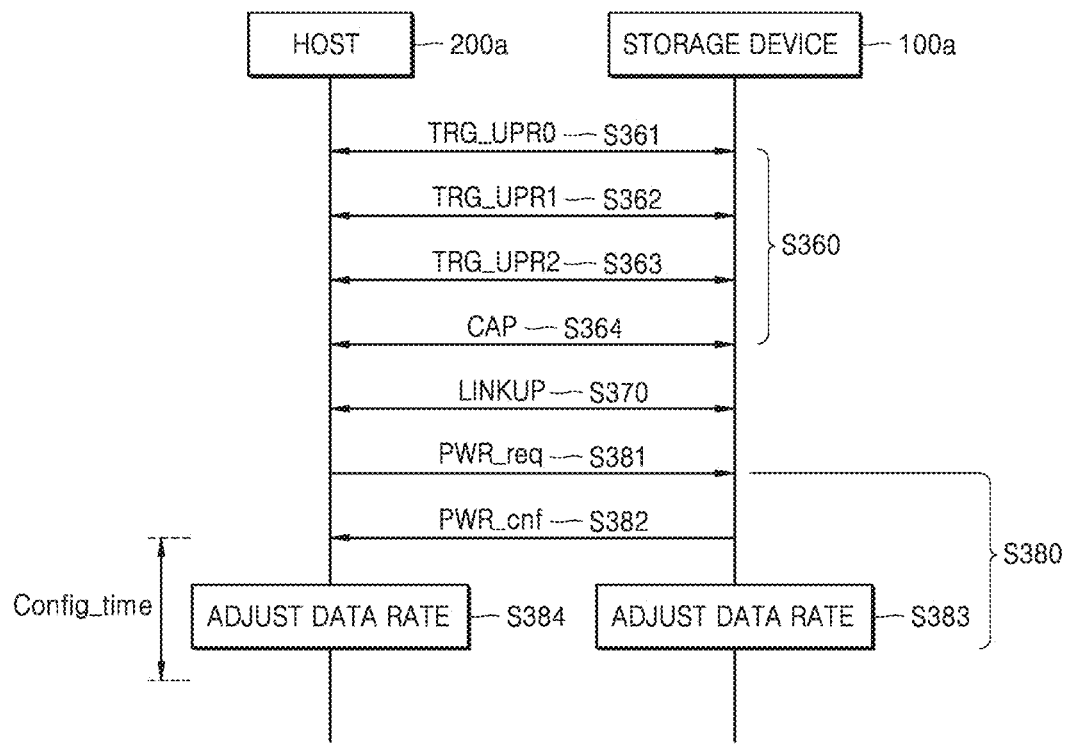
FIG. 4 is a flowchart for describing a link startup operation and a power mode change operation between a host and a storage device according to an example embodiment of the inventive concepts.

FIG. 4 is a flowchart for describing a link startup operation and a power mode change operation between a host and a storage device according to an example embodiment of the inventive concepts. For example, FIG. 4 is a flowchart for describing a link startup operation (operation S360) and a power mode change operation (operation S380) between a host 200a and a storage device 100a. When the link startup operation (operation S360) is performed, in operation S370, the host 200a and the storage device 100a may operate in a linked-up state.

The link startup operation (operation S360) may be performed by using a multi-operation handshake method in which UniPro trigger events are exchanged between the host 200a and the storage device 100a to establish initial link communication in both directions. The link startup operation (operation S360) may be defined as predetermined, or alternatively, desired operations (operations S361 to S365), a trigger event may be used for each operation, and each trigger event may be transmitted multiple times.

Operation S361 is a data lane discovery operation. In operation S361, lanes connected between the host 200a and the storage device 100a may be discovered. In operation S361, the host 200a and the storage device 100a may repeatedly send a first trigger event TRG_UPRO on all available TX lanes. The host 200 may continue to send the first trigger event TRG_UPRO until a first trigger event message is received from the storage device 100. The first trigger event TRG_UPRO sent from the host 200a may include the physical lane number of a TX lane of the host 200a from which the first trigger event TRG_UPR0 is transmitted. Also, the storage device 100a may continue to send the first trigger event TRG_UPR0 until a first trigger event message is received from the host 200a. The first trigger event TRG_UPR0 sent from the storage device 100a may include the physical lane number of a TX lane of the storage device 100a from which the first trigger event TRG_UPR0 is transmitted.

Operation S362 is a data lane realignment operation. In operation S362, the host 200a and the storage device 100a may transmit a second trigger event TRG_UPR1 on all available TX lanes. The host 200a may continue to send the second trigger event TRG_UPR1 until a second trigger event message is received from the storage device 100a. The second trigger event TRG_UPR1 sent from the host 200a may include information regarding TX lanes connected to the host 200a. Also, the storage device 100a may continue to send the second trigger event TRG_UPR1 until a second trigger event message is received from the host 200a. The second trigger event TRG_UPR1 sent from the storage device 100a may include information regarding TX lanes connected to the storage device 100a.

Operation S363 is a link startup termination operation. In operation S363, the host 200a and the storage device 100a may reflect the number of connected lanes in the properties of the PLs 111 and 211. In operation S363, the host 200a and the storage device 100a may send a third trigger event TRG_UPR2 on all available TX lanes. The host 200a may continue to send the third trigger event TRG_UPR2 until a message corresponding to the third trigger event TRG_UPR2 is received from the storage device 100a. The third trigger event TRG_UPR2 sent from the host 200a may include information regarding logical lane numbers of TX lanes connected to the host 200a. Also, the storage device 100a may continue to send the third trigger event TRG_UPR2 until a third trigger event message corresponding to the third trigger event TRG_UPR2 is received from the host 200a. The third trigger event TRG_UPR2 sent from the storage device 100a may include information regarding logical lane numbers of TX lanes connected to the storage device 100a. As operation 5363 is performed, the host 200 and the storage device 100a may have matched logical lane numbers for available lanes.

Operation S364 is a capability exchange operation. In operation S364, the host 200a and the storage device 100a may exchange capability information CAP. For example, the host 200a and the storage device 100a may exchange and recognize the capability information CAP of each other to communicate the architectural requirements of the interconnects 210 and 110. The architectural requirements of the interconnects 210 and 110 may include, for example, a bandwidth, timers, a speed gear, termination/untermination, scrambling, etc. As operation S364 is performed, the capability information CAP of each other is collected by the interconnects 210 and 110, and the properties of the PLs of the interconnects 210 and 110 may be set according to the collected capability information CAP. When operation S364 is performed, in operation S370, the host 200a and the storage device 100a may operate in a linked-up state. In the linked-up state, the host 200a and the storage device 100a may operate in a default power mode. The default power mode may be a high-speed mode (HS mode) or a low-speed mode (LS mode). Also, in the linked-up state, the host 200a and the storage device 100a may transmit/receive data at a default data rate. In an example embodiment, the default data rate may be a first data rate DR1.

Operation S380 is a power mode change operation. In operation S380, the host 200a and the storage device 100a may perform a power mode change operation, and a link configuration for a new power mode may be performed. Operation S380 may include a plurality of operations S381 to S384.

In operation S381, the host 200a may transmit a power mode change request PWR_req to the storage device 100a. The power mode change request PWR_req may include the type of a power mode to be changed to, speed gears, or speed series. The power mode may be an HS mode or an LS mode. The speed gear may refer to a data rate, and a speed series may refer to a group of a plurality of speed gears. For example, a speed series may be divided into a series A and a series B. The series A may include four speed gears respectively corresponding to 1.25 Gbps, 2.5 Gbps, 5 Gbps, and 10.0 Gbps. The series B may include speed gears having higher frequencies than the speed gears included in the series A. For example, speed gears included in the series B may correspond to frequencies higher than those of the speed gears included in the series A, e.g., 1.46 Gbps, 2.92 Gbps, 5.83 Gbps, and 11.66 Gbps.

In operation S382, the storage device 100a may send a power mode change response PWR_cnf to the host 200a. The power mode change response PWR_cnf may include status information, the type of the power mode, speed gears, or speed series. The status information may refer to information indicating whether a power mode may be changed.

For convenience of explanation, it has been described that the host 200a transmits the power mode change request PWR_req and the storage device 100a transmits the power mode change response PWR_cnf. However, in some example embodiments, the storage device 100a may transmit the power mode change request PWR_req to the host 200a, and the host 200a may transmit the power mode change response PWR_cnf to the storage device 100a. Hereinafter, in the present specification, it is assumed that the host 200a sends the power mode change request PWR_req and the storage device 100a sends the power mode change response PWR_cnf.

In operation S383, the storage device 100a may adjust a data rate after sending the power mode change response PWR_cnf. The data rate may be adjusted by changing the frequency of an internal clock signal. When data is sent over a line while the frequency of the internal clock signal is being changed, an error may occur. Therefore, during a predetermined, or alternatively, desired configured time Config_time, data may not be sent through the line LINE, and the frequency of the internal clock signal may be changed within the configured time Config_time.

In operation 5384, the host 200a may adjust a data rate after receiving the power mode change response PWR_cnf. In other words, the power mode change response PWR_cnf including status information indicating that the power mode may be changed may be received from the storage device 100a, and the frequency of the internal clock signal may be changed during the configured time Config_time.

A storage system according to an example embodiment of the inventive concepts may adjust a data rate by changing the frequency of the internal clock signal during the configured time Config_time in which data is not transmitted on a line. Also, the host 200a and the storage device 100a may exchange data stably by sending data after the configured time Config_time has elapsed.

Figure 5:
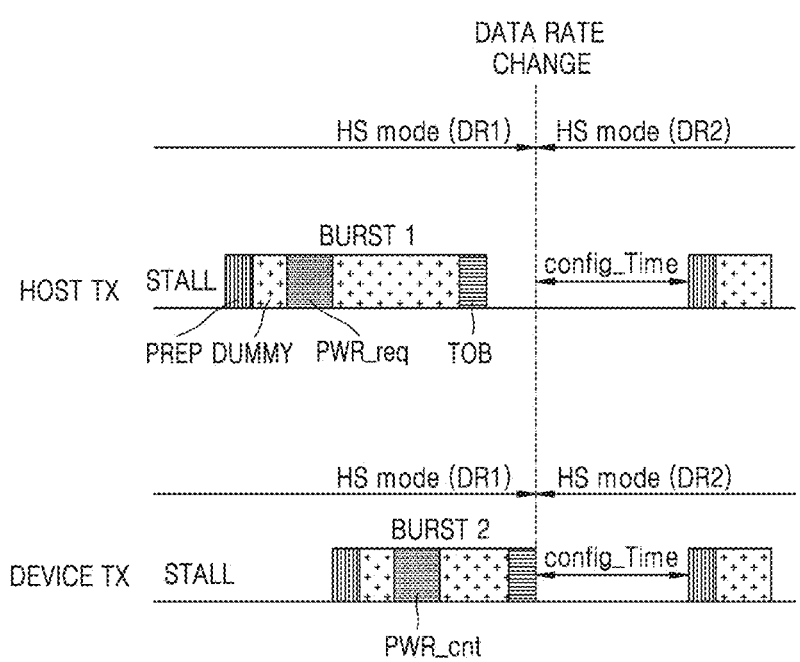
FIG. 5 is a diagram for describing adjustment of a data rate according to an example embodiment of the inventive concepts.

FIG. 5 is a diagram for describing adjustment of a data rate according to an example embodiment of the inventive concepts. For example, FIG. 5 shows data sent to the line LINE through the host transmitter HOST TX and the device transmitter DEVICE TX to adjust a data rate. Although not shown in FIG. 5, as described above with reference to FIG. 2, the host transmitter HOST TX may be connected to the device receiver DEVICE RX through the line LINE, and the device transmitter DEVICE TX may be connected to the host receiver HOST RX through the line LINE. Therefore, data received through the device receiver DEVICE RX may be the same as data sent through the host transmitter HOST TX, but a phase difference may occur as much as a line delay. Data received through the host receiver HOST RX may be the same as data sent through the device transmitter DEVICE TX, but a phase difference may occur as much as a line delay. FIG. 5 may be described below with reference to at least one of FIGS. 1 to 4.

Referring to FIG. 5, the host 200 and the storage device 100 may adjust the data rate while maintaining the HS mode. The HS mode may be a power mode in which bits sent through a lane are expressed through logic levels, wherein a non-return to zero (NRZ) scheme in which there is no need for a logic low period between periods even when logic high periods continue may be applied to the HS mode. In the HS mode, the data rate may be determined according to the frequency of an internal clock signal generated by dividing a reference clock signal.

According to the frequency of the reference clock signal, the data rate may be divided into speed series A and B. For example, data rates determined based on a first reference clock signal having a first frequency may be referred to as series A, and data rates determined based on a second reference clock signal having a second frequency may be referred to as series B. The series A and B may each include a plurality of speed gears. By dividing a reference clock signal, internal clock signals having various frequencies may be generated, and a data rate corresponding to each internal clock signal may be referred to as a speed gear.

The host transmitter HOST TX or the device transmitter DEVICE TX may be in at least one of a power saving state and a burst state. The power saving state is a state for reducing or minimizing power consumption and may be a state in which the line LINE is driven with a negative differential line voltage DIF-N or a zero differential line voltage DIF-Z. The power saving state may be one of a stall state, a sleep state, a hibernate state, a disabled state, and an unpowered state. In embodiments of the inventive concepts, it is assumed that the power saving state is the stall state. The burst state is a state in which data is sent through the line LINE and may be a state in which the line LINE is driven with a positive differential line voltage DIF-P. The burst state may include an HS burst state in which data is sent in an HS mode and an LS burst state in which data is sent in an LS mode. The line LINE may have a DIF-Q state indicating a high impedance state or a DIF-X state other than a DIF-N state or a DIF-P state. Here, the differential line voltage may be defined as a value obtained by subtracting a voltage of a line connected to a negative node from a voltage of a line connected to a positive node.

The line LINE may correspond to any line included in the interface 20 shown in FIG. 2. For example, the line LINE may correspond to a differential input signal line through which the differential input signals DIN_t and DIN_c of FIG. 1 are sent. For example, when the voltage level of the second pin P2a' to which the positive input signal DIN_t is applied is higher than the voltage level of the second pin P2b' to which the negative input signal DIN_c is applied, the line LINE may be in the DIF-P state or may be logic high. For example, when the voltage level of the second pin P2a' to which the positive input signal DIN_t is applied is lower than the voltage level of the second pin P2b' to which the negative input signal DIN_c is applied, the line LINE may be in the DIF-N state or may be logic low. For example, when the voltage level of the second pin P2a' to which the positive input signal DIN_t is applied is almost identical to the voltage level of the second pin P2b' to which the negative input signal DIN_c is applied, the line LINE may be in the DIF-Z state or a grounded state.

Referring to FIG. 5, a bit sequence sent through a line in a burst state may be referred to as a burst. The burst may include a prepare period, a dummy period, the power mode change request PWR_req or the power mode change response PWR_cnf, and a TOB. The prepare period may be a period indicating the start of a burst and may be a period in which a line is driven with the positive differential line voltage DIF-P. The dummy period may be a period including at least one bit representing meaningless data. The host receiver HOST RX and the device receiver DEVICE RX may ignore data included in a dummy period in a received burst. The power mode change request PWR_req may include information for requesting to change a data rate. The power mode change response PWR_cnf may include information responding to the power mode change request PWR_req. The TOB may be at least one bit indicating the end of a burst. The TOB may be a bit sent during a period in which a line is driven with the negative differential line voltage DIF-N. The TOB may include an MK symbol or a filler symbol described in the UniPro specification.

Referring to FIG. 5, the host 200 may send a first burst BURST 1 at a first data rate DR1 through the host transmitter HOST TX in an HS mode. The first burst BURST 1 may include the power mode change request PWR_req for requesting to change the data rate to a second data rate DR2.

The storage device 100 may send a second burst BURST 2 at the first data rate DR1 through the device transmitter DEVICE TX in the HS mode. The second burst BURST 2 may include the power mode change response PWR_cnf corresponding to the power mode change request PWR_req.

When the TOB of the second burst BURST 2 is output through the device transmitter DEVICE TX, the storage device 100 may adjust the data rate to the second data rate DR2. For example, when the TOB is output, the clock generator 113 may adjust the data rate to the second data rate DR2 by changing the frequency of the internal clock signal. During the predetermined, or alternatively, desired configured time Config_time, data may not be sent through the line LINE connected to the device transmitter DEVICE TX, and the data rate may be adjusted within the configured time Config_time.

In some example embodiments, the clock generator 113 may be used in common for the device transmitter DEVICE TX and the device receiver DEVICE RX. Therefore, when the frequency of an internal clock signal is changed immediately after the device receiver DEVICE RX receives the power mode change request PWR_req from the host transmitter HOST TX, the power mode change response PWR_cnf sent through the device transmitter DEVICE TX may not reach the host receiver HOST RX. The storage device 100 according to an example embodiment of the inventive concepts may change the frequency of the internal clock signal after the second burst BURST 2 is output, thereby using a common internal clock signal to change data rates for the device transmitter DEVICE TX and the device receiver DEVICE RX. In other words, because data rates for the device transmitter DEVICE TX and the device receiver DEVICE RX may be changed by using one phase locked loop (PLL) circuit, the size of a storage system may be reduced.

When the TOB of the second burst BURST 2 is received through the host receiver HOST RX, the host 200 may adjust the data rate to the second data rate DR2. Although not shown, the host receiver HOST RX may be connected to the device transmitter DEVICE TX through a line. For example, when the TOB is received, the clock generator 213 may adjust the data rate to the second data rate DR2 by changing the frequency of the internal clock signal. During the predetermined, or alternatively, desired configured time Config_time, data may not be sent through the line LINE connected to the host transmitter HOST TX, and the data rate may be adjusted within the configured time Config_time.

In some example embodiments, the clock generator 213 may be used in common for the host transmitter HOST TX and the host receiver HOST RX. Therefore, when the frequency of an internal clock signal is changed immediately after the host transmitter HOST TX sends the power mode change request PWR_req to the device receiver DEVICE RX, the power mode change response PWR_cnf sent through the device transmitter DEVICE TX may not reach the host receiver HOST RX. The host 200 according to an example embodiment of the inventive concepts may change the frequency of the internal clock signal after the second burst BURST 2 is received, thereby using a common internal clock signal to change data rates for the host transmitter HOST TX and the host receiver HOST RX. In other words, because data rates for the host transmitter HOST TX and the host receiver HOST RX may be changed by using one PLL circuit, the size of a storage system may be reduced.

When the data rate is adjusted while maintaining an HS mode, an error may occur in data being sent while the frequency of the internal clock signal is changed. Therefore, the frequency of the internal clock signal may be changed in an LS mode. The LS mode may be a transmission mode that does not use a reference clock signal. For example, the LS mode may be based on a pulse width modulation (PWM) scheme. In the LS mode based on the PWM scheme, a return to zero (RZ) scheme in which a logic low period needs to exist between logic high periods of a signal transmitted through a lane may be applied. In other words, because the LS mode is a transmission mode that does not use an internal clock signal, even when the frequency of an internal clock signal is adjusted in the LS mode, an error may not occur in transmitted data.

However, to change the data rate of the HS mode, when the power mode is changed to the LS mode, the frequency of the internal clock signal is changed in the LS mode, and the power mode is changed back to the HS mode, it may take a significant amount of time.

In a storage system according to an example embodiment of the inventive concepts, data errors may not occur even when a data rate is changed while maintaining an HS mode by changing the frequency of a reference clock signal during a configured time in which data is not transmitted through a lane.

Figure 6:
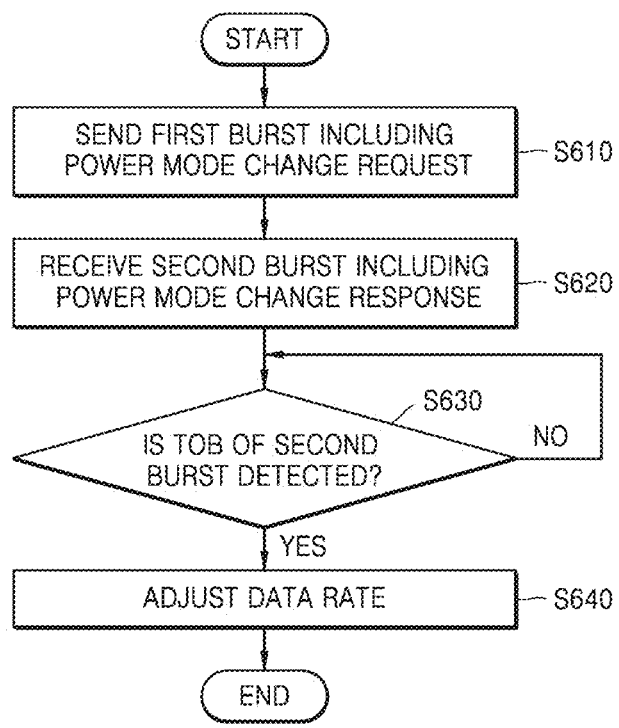
FIG. 6 is a flowchart of a method of operating a host according to an example embodiment of the inventive concepts.

FIG. 6 is a flowchart of a method of operating a host according to an example embodiment of the inventive concepts. For example, FIG. 6 shows a method of adjusting data rates for the host transmitter HOST TX and the host receiver HOST RX. A method of operating a host may include a plurality of operations S610 to S640. FIG. 6 may be described below with reference to at least one of FIGS. 1 to 5.

In operation S610, the host 200 may send the first burst BURST 1 including the power mode change request PWR_req to the storage device 100 through the host transmitter HOST TX. The first burst BURST 1 may be a bit sequence sent to the storage device 100 through a line while the host transmitter HOST TX maintains a burst state. The power mode change request PWR_req may include the type of a power mode to be changed to, speed gears, or speed series. The power mode may be an HS mode or an LS mode. The speed gear may refer to a data rate, and a speed series may refer to a group of a plurality of speed gears.

In operation S620, the host 200 may receive the second burst BURST 2 including the power mode change response PWR_cnf from the storage device 100 through the host receiver HOST RX. The second burst BURST 2 may be a bit sequence sent to the host 200 through a line while the device transmitter DEVICE TX maintains a burst state. The power mode change response PWR_cnf may correspond to the power mode change request PWR_req and may include state information, the type of a power mode, speed gears, or speed series. The status information may refer to information indicating whether a power mode may be changed.

In operation S630, the TOB detector 221 included in the host 200 may detect the TOB of the second burst BURST 2. The TOB detector 221 may detect a TOB by identifying a predetermined, or alternatively, desired bit sequence. When the TOB is not detected, the TOB detector 221 may perform a detection operation until the TOB is detected, and, when the TOB is detected, operation S640 may be performed.

In operation S640, the host 200 may adjust data rates for the host transmitter HOST TX and the host receiver HOST RX. For example, the clock generator 213 may change the frequency of a reference clock signal or change the frequency of an internal clock signal generated based on the reference clock signal, thereby setting a data rate corresponding to a speed gear or a speed series included in the power mode change request PWR_req. In some example embodiments, in operation S640, as described above with reference to FIG. 3, the oscillator 410 may change the frequency of the reference clock signal or the divider 460 may change a division ratio, thereby changing the frequency of the internal clock signal.

A host according to an example embodiment of the inventive concepts may determine when all bursts are received from the storage device by detecting the TOB. Therefore, a data rate may be adjusted when data is not sent through lines connected to the host transmitter HOST TX and the host receiver HOST RX, and thus transmission data errors that may occur while the data rate is being adjusted may be reduced or prevented.

Also, because data rates for both the host transmitter HOST TX and the host receiver HOST RX may be adjusted by using one clock generator 213, the size of a storage system may be reduced as compared to example embodiments where clock generators are respectively provided for the host transmitter HOST TX and the host receiver HOST RX.

Figure 7:
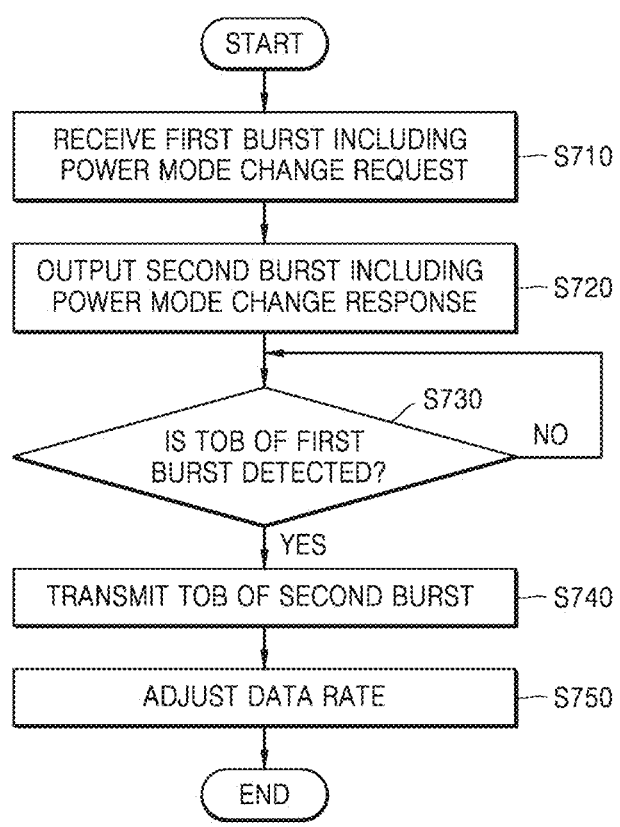
FIG. 7 is a flowchart of a method of operating a storage device, according to an example embodiment of the inventive concepts.

FIG. 7 is a flowchart of a method of operating a storage device, according to an example embodiment of the inventive concepts. For example, FIG. 7 shows a method of adjusting data rates for the device transmitter DEVICE TX and the device receiver DEVICE RX. A method of operating a storage device may include a plurality of operations S710 to S740. FIG. 7 may be described below with reference to FIGS. 1 to 5.

In operation S710, as described above with reference to FIG. 5, the storage device 100 may receive the first burst BURST 1 including the power mode change request PWR_req through the device receiver DEVICE RX from the host 200.

In operation S720, as described above with reference to FIG. 5, the storage device 100 may send the second burst BURST 2 including the power mode change response PWR_cnf to the host 200 through the device transmitter DEVICE RX. The power mode change response PWR_cnf may correspond to the power mode change request PWR_req and may include state information, the type of a power mode, speed gears, or speed series. The status information may refer to information indicating whether a power mode may be changed.

In operation S730, the TOB detector 121 included in the storage device 100 may detect the TOB of the first burst BURST 1. The TOB detector 121 may detect a TOB by identifying a predetermined, or alternatively, desired bit sequence. When the TOB is not detected, the TOB detector 121 may perform a detection operation until the TOB is detected, and, when the TOB is detected, operation S740 may be performed.

In operation S740, the storage device 100 may send the TOB of the second burst BURST 2 through the device transmitter DEVICE TX. After the TOB is sent, data may not be sent on the line LINE until the configured time Config_time has elapsed.

In operation S750, the storage device 100 may adjust data rates for the device transmitter DEVICE TX and the device receiver DEVICE RX. For example, the clock generator 113 may receive a reference clock signal having a changed frequency from the host 200 or change the frequency of an internal clock signal generated based on a reference clock signal, thereby setting a data rate corresponding to a speed gear or a speed series included in the power mode change request PWR_req. In some example embodiments, in operation S750, as described above with reference to FIG. 3, the oscillator 410 may change the frequency of the reference clock signal or the divider 460 may change a division ratio, thereby changing the frequency of the internal clock signal. The storage device 100 may change the frequency of the internal clock signal during the configured time Config_time.

A storage device according to an example embodiment of the inventive concepts may determine when all bursts are received from a host by detecting the TOB. The storage device may adjust a data rate when the TOB is detected. In other words, because the storage device adjusts a data rate during the configured time Config_time in which data is not sent to lines connected to the device transmitter DEVICE TX and the device receiver DEVICE RX, errors that may occur in transmission data during adjustment of the data rate may be reduced or prevented.

Also, because data rates for both the device transmitter DEVICE TX and the device receiver DEVICE RX may be adjusted by using one clock generator 113, the size of a storage system may be reduced as compared to example embodiments where clock generators are respectively provided for the device transmitter DEVICE TX and the device receiver DEVICE RX.

Figure 8:
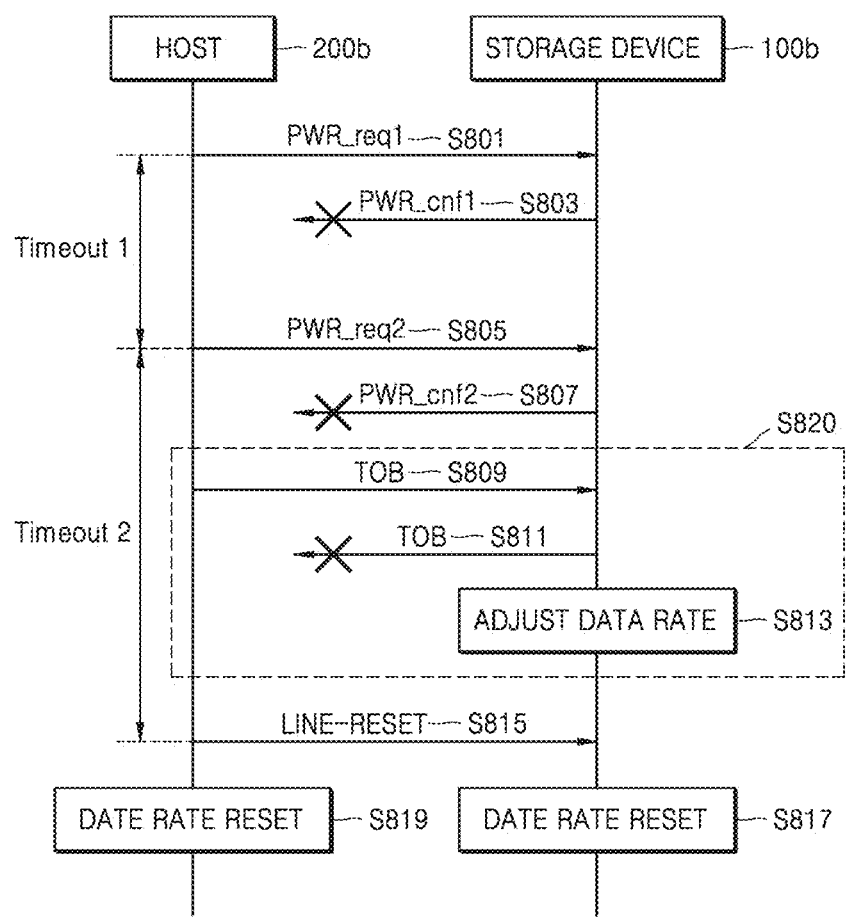
FIG. 8 is a diagram for describing a data rate reset operation according to an example embodiment of the inventive concepts.

FIG. 8 is a diagram for describing a data rate reset operation according to an example embodiment of the inventive concepts. For example, in FIG. 8, it is assumed that, due to an error occurring in the line LANE including the host receiver HOST RX and the device transmitter DEVICE TX, data sent by a storage device 100b does not reach a host 200b. Also, it is assumed that the host 200b and the storage device 100b send/receive data at a first data rate DR1 until a data rate is adjusted or reset. The data rate reset operation may include a plurality of operations S801 to S819.

In operation S801, the host 200b may send the first burst BURST 1 including a first power mode change request PWR_req1 through the host transmitter HOST TX. The host 200b may send the first power mode change request PWR_req1 and monitor whether a first power mode change response PWR_cnf1 is received within a first timeout TIMEOUT 1. In operation S803, the storage device 100b may send the second burst BURST 2 including the first power mode change response PWR_cnf1 through the device transmitter DEVICE TX in response to the first power mode change request PWR_req1. However, due to an error in the lane LANE including the device transmitter DEVICE, the first power mode change response PWR_cnf1 may not reach the host 200b.

In operation S805, when the first power mode change response PWR_cnf1 is not received within the first timeout TIMEOUT 1, the host 200b may send a second power mode change request PWR_req2 through the host transmitter HOST TX. The second power mode change request PWR_req2 may be included in the first burst BURST 1. The host 200b may send the second power mode change request PWR_req2 and monitor whether a second power mode change response PWR_cnf2 is received within a second timeout TIMEOUT 2. The length of the second timeout TIMEOUT 2 may be the same as or different from the length of the first timeout TIMEOUT 1. In operation S807, the storage device 100b may send the second power mode change response PWR_cnf2 through the device transmitter DEVICE TX in response to the second power mode change request PWR_req2. The second power mode change response PWR_cnf2 may be included in the second burst BURST 2. However, due to an error in the lane LANE including the device transmitter DEVICE, the second power mode change response PWR_cnf2 may not reach the host 200b.

In some example embodiments, after operation S807, operation S820 for adjusting the data rate of the storage device 100b may be performed. Operation S820 may include a plurality of operations S809 to S813. In operation S809, the host 200b may send the TOB of the first burst BURST 1 through the host transmitter HOST TX. In operation S811, the storage device 100b may detect the TOB of the first burst BURST 1 and send the TOB of the second burst BURST 2 through the device transmitter DEVICE TX. However, due to an error in the lane LANE including the device transmitter DEVICE, the TOB of the second burst BURST 2 may not reach the host 200b. In operation S813, as described above with reference to FIG. 7, the storage device 100b may send the TOB of the second burst BURST 2 and change the data rate from the first data rate DR1 to the second data rate DR2. In some example embodiments, operation S820 may be omitted.

In operation S815, when the second power mode change response PWR_cnf2 is not received within the second timeout TIMEOUT 2, the host 200b may send a line reset signal to the storage device 100b. The line reset signal may be sent through a dedicated reset signal pin. The line reset signal may be a signal indicating reset of the PL 111 of the interconnect 110 when a malfunction occurs. In operation S817, the storage device 100b may reset the data rates of the device receiver DEVICE RX and the device transmitter DEVICE TX included in the PL 111. Because the host 200b did not adjust the data rate, when a timeout occurs, the data rate of the host 200b may be set to the first data rate DR1.

In some example embodiments, the storage device 100b may reset the data rate to a data rate before the reception of the line reset signal, that is, the first data rate DR1. Therefore, even when only the data rate of the storage device 100b is reset, the host 200b and the storage device 100b may communicate smoothly using the same data rate.

In some example embodiments, the storage device 100*b* may reset the data rate to a default data rate. The default data rate may be pre-set in the link startup operation (operation S360) of FIG. 4. The default data rate may be selected from among a plurality of speed gears included in each of a plurality of speed series. For example, the default data rate may be the first data rate DR1 or the second data rate DR2. In some example embodiments, the host 200*b* may perform operation S819. In operation S819, the host 200*b* may reset the data rate to the default data rate. In other words, by performing operation S819, the host 200*b* and the storage device 100*b* are reset to the same default data rate, and thus the host 200*b* and the storage device 100*b* may communicate smoothly using the same data rate.

Figure 9:
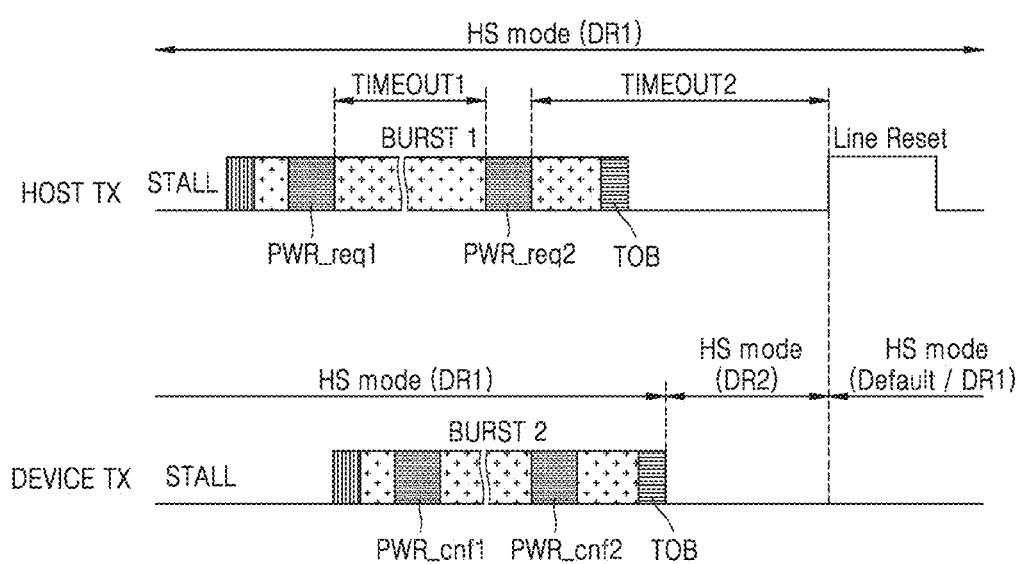
FIG. 9 is a diagram for describing adjustment of a data rate according to an example embodiment of the inventive concepts.

FIG. 9 is a diagram for describing adjustment of a data rate according to an example embodiment of the inventive concepts. For example, FIG. 9 is a diagram for describing an example embodiment in which data sent from the device transmitter DEVICE TX does not reach the host receiver HOST RX due to a link error. Therefore, FIG. 9 may be described below with reference to FIG. 8, and descriptions identical to those given above with reference to FIG. 5 may be omitted.

Referring to FIG. 9, the host 200*b* may send a first burst BURST 1 at a first data rate DR1 through the host transmitter HOST TX in an HS mode. The first burst BURST 1 may include the first power mode change request PWR_req1 for requesting to change the data rate to a second data rate DR2. The host 200*b* may monitor whether the first power mode change response PWR_cnf1 corresponding to the first power mode change request PWR_req1 arrives within the first timeout TIMEOUT 1. The storage device 100*b* may send the first power mode change response PWR_cnf1 in response to the first power mode change request PWR_req1. However, due to a link error, the first power mode change response PWR_cnf1 may not be able to reach the host receiver HOST RX.

The host 200*b* may send the second power mode change request PWR_req2 when the first timeout TIMEOUT 1 has elapsed. The second power mode change request PWR_req2 may be included in the first burst BURST 1. The host 200*b* may monitor whether the second power mode change response PWR_cnf2 corresponding to the second power mode change request PWR_req2 arrives within the second timeout TIMEOUT 2. The storage device 100*b* may send the second power mode change response PWR_cnf2 in response to the second power mode change request PWR_req2. However, due to a link error, the second power mode change response PWR_cnf2 may not be able to reach the host receiver HOST RX.

The host 200*b* may transmit the TOB of the first burst BURST 1, as described above in operation S809 of FIG. 8. The storage device 100*b* may receive the TOB of the first burst BURST 1 and output the TOB of the second burst BURST 2, as described above in operation S811 of FIG. 8. The storage device 100*b* may adjust the data rate from the first data rate DR1 to the second data rate DR2 as described above in operation S813 of FIG. 8.

The host 200*b* may transmit a line reset signal when the second timeout TIMEOUT 2 has elapsed. The storage device 100*b* may detect the line reset signal and reset the data rate. In some example embodiments, the data rate may be reset to a data rate before the reception of the line reset signal, that is, the first data rate DR1. In some example embodiments, the storage device 100*b* may reset the data rate to a default data rate. The default data rate may be pre-set in the link startup operation (operation S360) of FIG. 4.

Figure 10:
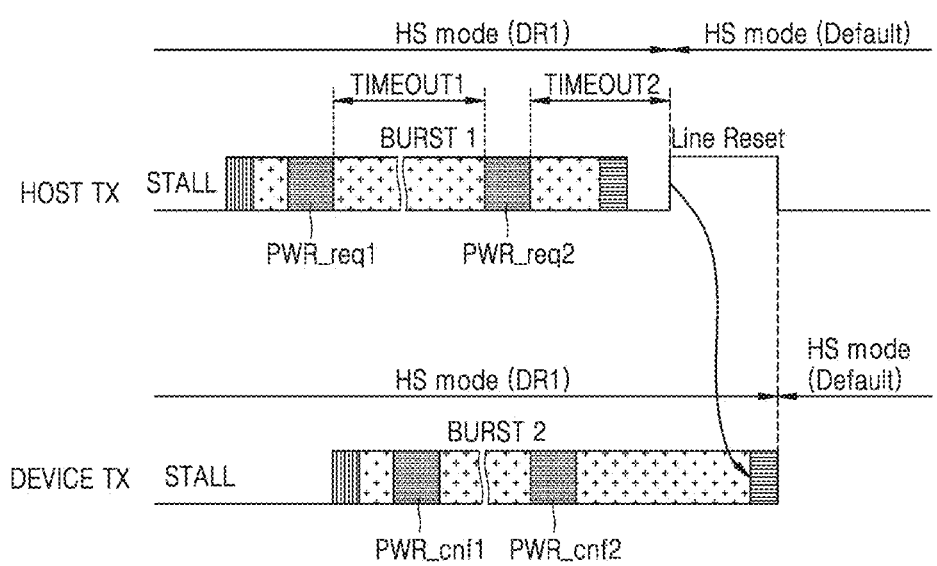
FIG. 10 is a diagram for describing adjustment of a data rate according to an example embodiment of the inventive concepts.

FIG. 10 is a diagram for describing adjustment of a data rate according to an example embodiment of the inventive concepts. For example, FIG. 10 is a diagram for describing a situation in which the second burst BURST 2 is not terminated when the host 200*b* sends a line reset signal. Descriptions identical to those given above with reference to FIG. 9 may be omitted.

Referring to FIG. 10, unlike as in FIG. 9, when the host 200*b* sends a line reset signal, the second burst BURST 2 sent by the device transmitter DEVICE TX may not be terminated. In other words, the TOB of the second burst BURST 2 may have not been sent.

Therefore, the storage device 100*b* may detect the line reset signal and transmit the TOB of the second burst BURST 2 to the host 200*b*. In other words, the storage device 100*b* may reduce or prevent an error that may be included in the second burst BURST 2 while the data rate is being reset by terminating the second burst BURST 2 before resetting the data rate.

As described above in operation S819 of FIG. 8, the host 200*b* may send a line reset signal and reset the data rate to the default data rate. The default data rate may correspond to a speed gear included in the HS mode, but example embodiments are not limited thereto. In other words, the default data rate may correspond to an LS mode that does not use an internal clock signal.

After the TOB of the second burst BURST 2 is sent, the storage device 100*b* may reset the data rate to the default data rate. Through the line reset operation, the data rates of the host 200*b* and the storage device 100*b* are reset to the default data rate, and thus the host 200*b* and the storage device 100*b* may communicate smoothly using the same data rate.

Figure 11:
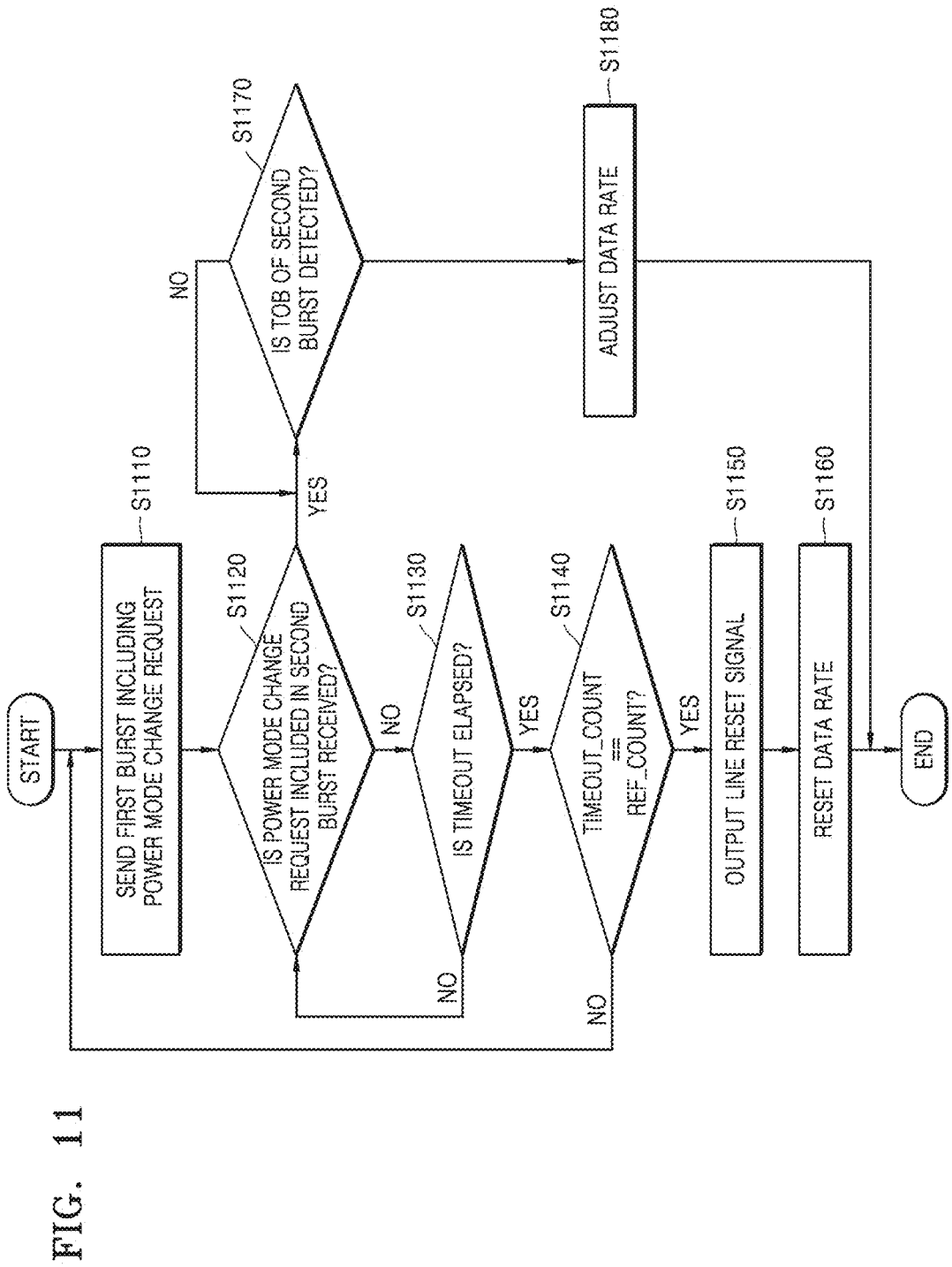
FIG. 11 is a flowchart of a method of operating a host according to an example embodiment of the inventive concepts.

FIG. 11 is a flowchart of a method of operating a host according to an example embodiment of the inventive concepts. For example, FIG. 11 is a flowchart for describing a method of operating a host to reset a data rate by outputting a line reset signal based on a timeout. The method of operating a host may include a plurality of operations S1110 to S1180. FIG. 11 may be described below with reference to at least one of FIGS. 1 to 10.

In operation S1110, the host 200*b* may transmit the first burst BURST 1 including the power mode change request PWR_req. In operation S1120, the host 200*b* may identify whether the power mode change response PWR_cnf included in the second burst BURST 2 is received from the storage device 100*b*. When the power mode change response PWR_cnf is received, operation S1170 may be performed. When the power mode change response PWR_cnf is not received, operation S1130 may be performed.

In operation S1170, the host 200*b* may detect the TOB of the second burst BURST 2. For example, the TOB detector 221 included in the host 200 of FIG. 1 may detect the TOB by identifying a predetermined, or alternatively, desired bit sequence. The host 200*b* may repeatedly perform a detection operation until the TOB is detected, and, when the TOB is detected, operation S1180 may be performed.

In operation S1180, the host 200*b* may adjust data rates for the host transmitter HOST TX and the host receiver HOST RX. For example, as described above with reference to the drawings, the host 200*b* may adjust the data rate from the first data rate DR1 to the second data rate DR2. The data rate may be adjusted by changing the frequency of a reference clock signal or by changing the frequency of an internal clock signal.

In operation S1130, the host 200b may determine whether a timeout has elapsed. When the timeout has not elapsed, in operation S1120, the timeout may be monitored until the power mode change response PWR_cnf is received. When the timeout has elapsed, operation S1140 may be performed.

In operation S1140, the host 200b may determine whether a timeout count Timeout count reached a reference count ref count. As described above with reference to FIG. 10, the reference count ref_count may be two, but embodiments are not limited thereto. When the timeout count Timeout_count does not reach the reference count ref count, the host 200b may send the power mode change request PWR_req to the storage device 100b again in operation S1110. When the timeout count Timeout_count reached the reference count ref_count, operation S1150 may be performed.

In operation S1150, the host 200b may output a line reset signal to the storage device 100b through the reset signal pin. The line reset signal may be a signal indicating reset of the PL 111 of the interconnect 110 shown in FIG. 1 when a malfunction occurs.

In operation S1160, the host 200b may reset the data rate to the default data rate. The default data rate may be pre-set in the link startup operation (operation S360) of FIG. 4.

A host according to an example embodiment of the inventive concepts outputs a line reset signal and resets a data rate when a timeout has elapsed, and thus, even when an error occurs in a line, data may be smoothly sent/received to/from a storage device.

Figure 12:
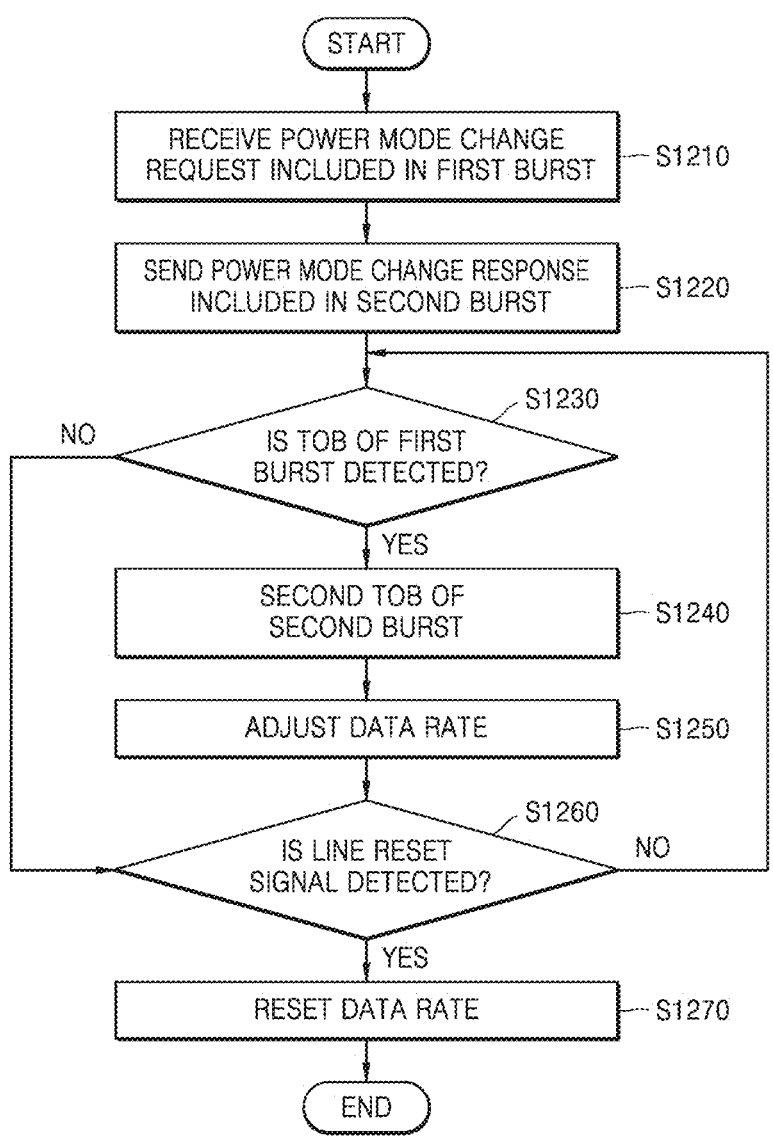
FIG. 12 is a flowchart of a method of operating a storage device, according to an example embodiment of the inventive concepts.

FIG. 12 is a flowchart of a method of operating a storage device, according to an example embodiment of the inventive concepts. For example, FIG. 12 is a flowchart for describing a method of operating a storage device that resets a data rate based on a line reset signal. The method of operating a storage device may include a plurality of operations S1210 to S1260. FIG. 12 may be described below with reference to at least one of FIGS. 1 to 10.

In operation S1210, the storage device 100b may receive the power mode change request PWR_req included in the first burst BURST 1 through the device receiver DEVICE RX. In operation S1220, the storage device 100b may send the power mode change response PWR_cnf included in the second burst BURST 2 through the device transmitter DEVICE TX. Although FIG. 12 shows that the power mode change request PWR_req and the power mode change response PWR_cnf are each sent/received once, embodiments are not limited thereto. For example, as described above with reference to FIG. 11, the power mode change requests PWR_req may be received for a plurality of number of times from the host 200b by a timeout, and, in response thereto, the storage device 100b may send the power mode change response PWR_cnf for a plurality of number of times.

In operation S1230, the storage device 100b may detect the TOB of the first burst BURST 1. For example, the TOB detector 121 included in the device controller 120 of FIG. 1 may detect the TOB of the first burst BURST 1. When the TOB is detected, operation S1240 may be performed. When the TOB is not detected, operation S1260 may be performed.

In operation S1240, the storage device 100b may terminate the second burst BURST 2 by sending the TOB of the second burst BURST 2. By terminating the second burst BURST 2 before adjusting the data rate, errors that may be included in the second burst BURST 2 while the data rate is being adjusted may be reduced or prevented in advance.

In operation S1250, the storage device 100b may adjust the data rate. For example, as shown in FIG. 9, the storage device 100b may adjust the data rate from the first data rate DR1 to the second data rate DR2. The first data rate DR1 and the second data rate DR2 may be data rates of the HS mode that are determined based on the frequency of an internal clock signal. The data rate may be adjusted by changing the frequency of a reference clock signal or by changing the frequency of an internal clock signal.

In operation S1260, the storage device 100b may detect a line reset signal. When the line reset signal is detected, operation S1270 may be performed. When the line reset signal is not detected, operation S1230 may be performed again.

In operation S1270, the storage device 100b may reset the data rate. For example, the storage device 100b may reset the data rate to a data rate before the line reset signal is detected or to a default data rate. In some example embodiments, when the data rate is adjusted from the first data rate DR1 to the second data rate DR2 in operation S1250, in operation S1270, the storage device 100b may reset the data rate to the first data rate DR1 based on the line reset signal. In some example embodiments, the default data rate may be set in the link startup operation (operation S360) described above with reference to FIG. 4. The default data rate may correspond to a speed gear included in the HS mode, but embodiments are not limited thereto. In other words, the default data rate may correspond to an LS mode that does not use an internal clock signal.

In some example embodiments, as described above with reference to FIG. 10, when the line reset signal is detected, the TOB of the second burst (BURST 2) may not have been sent. Therefore, in operation S1270, the storage device 100b may send the TOB of the second burst BURST 2 before resetting the data rate, thereby reducing or preventing a transmission error from occurring while the data rate is being reset.

Figure 13:
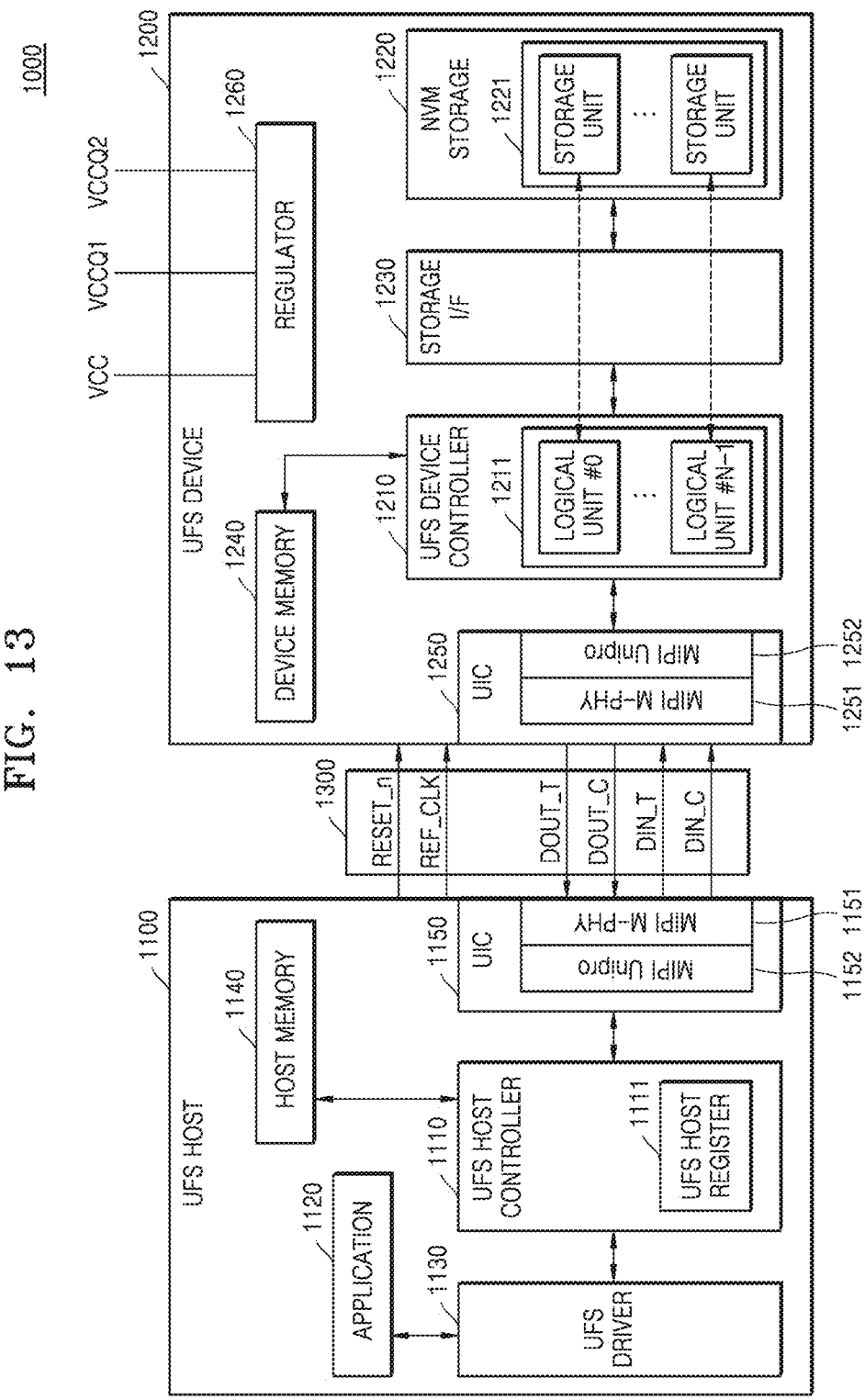
FIG. 13 is a diagram of a universal flash storage (UFS) system according to an example embodiment of the inventive concepts.

FIG. 13 is a diagram of a UFS system 1000 according to an embodiment. The UFS system 1000 may be a system conforming to a UFS standard announced by Joint Electron Device Engineering Council (JEDEC) and include a UFS host 1100, a UFS device 1200, and/or a UFS interface 1300. The above description of the system 10 of FIG. 1 may also be applied to the UFS system 1000 of FIG. 13 within a range that does not conflict with the following description of FIG. 13.

Referring to FIG. 13, the UFS host 1100 may be connected to the UFS device 1200 through the UFS interface 1300. When the host 200 of FIG. 1 is an AP, the UFS host 1100 may be implemented as a portion of the AP. The UFS host controller 1110 may correspond to the host controller 220 of the host 200 of FIG. 1. The UFS device 1200 may correspond to the storage device 100 of FIG. 1, and a UFS device controller 1210 and an NVM 1220 may correspond to the device controller 120 and the NVM 130 of FIG. 1, respectively.

The UFS host 1100 may include a UFS host controller 1110, an application 1120, a UFS driver 1130, a host memory 1140, and/or a UFS interconnect (UIC) layer 1150. The UFS device 1200 may include the UFS device controller 1210, the NVM 1220, a storage interface 1230, a device memory 1240, a UIC layer 1250, and/or a regulator 1260. The NVM 1220 may include a plurality of memory units 1221. Although each of the memory units 1221 may include a V-NAND flash memory having a 2D structure or a 3D structure, each of the memory units 1221 may include another kind of NVM, such as PRAM and/or RRAM. The UFS device controller 1210 may be connected to the NVM 1220 through the storage interface 1230. The storage interface 1230 may be configured to comply with a standard protocol, such as Toggle or ONFI.

The application 1120 may refer to a program that wants to communicate with the UFS device 1200 to use functions of the UFS device 1200. The application 1120 may transmit input-output requests (IORs) to the UFS driver 1130 for input/output (I/O) operations on the UFS device 1200. The IORs may refer to a data read request, a data storage (or write) request, and/or a data erase (or discard) request, without being limited thereto.

The UFS driver 1130 may manage the UFS host controller 1110 through a UFS-host controller interface (UFS-HCI). The UFS driver 1130 may convert the IOR generated by the application 1120 into a UFS command defined by the UFS standard and transmit the UFS command to the UFS host controller 1110. One IOR may be converted into a plurality of UFS commands. Although the UFS command may basically be defined by an SCSI standard, the UFS command may be a command dedicated to the UFS standard.

The UFS host controller 1110 may transmit the UFS command converted by the UFS driver 1130 to the UIC layer 1250 of the UFS device 1200 through the UIC layer 1150 and the UFS interface 1300. During the transmission of the UFS command, a UFS host register 1111 of the UFS host controller 1110 may serve as a command queue (CQ).

The UIC layer 1150 on the side of the UFS host 1100 may include a mobile industry processor interface (MIPI) M-PHY 1151 and/or an MIPI UniPro 1152, and the UIC layer 1250 on the side of the UFS device 1200 may also include an MIPI M-PHY 1251 and/or an MIPI UniPro 1252.

The UFS interface 1300 may include a line configured to transmit a reference clock signal REF_CLK, a line configured to transmit a hardware reset signal RESET_n for the UFS device 1200, a pair of lines configured to transmit a pair of differential input signals DIN_t and DIN_c, and/or a pair of lines configured to transmit a pair of differential output signals DOUT_t and DOUT_c.

A frequency of a reference clock signal REF_CLK provided from the UFS host 1100 to the UFS device 1200 may be one of 19.2 MHz, 26 MHz, 38.4 MHz, and 52 MHz, without being limited thereto. The UFS host 1100 may change the frequency of the reference clock signal REF_CLK during an operation, that is, during data transmission/receiving operations between the UFS host 1100 and the UFS device 1200. The UFS device 1200 may generate clock signals having various frequencies from the reference clock signal REF_CLK provided from the UFS host 1100, by using an operation-locked loop (PLL). Also, the UFS host 1100 may set a data rate between the UFS host 1100 and the UFS device 1200 by using the frequency of the reference clock signal REF_CLK. That is, the data rate may be determined depending on the frequency of the reference clock signal REF_CLK.

The UFS interface 1300 may support a plurality of lanes, each of which may be implemented as a pair of differential lines. For example, the UFS interface 1300 may include at least one receiving lane and at least one transmission lane. In FIG. 13, a pair of lines configured to transmit a pair of differential input signals DIN_T and DIN_C may constitute a receiving lane, and a pair of lines configured to transmit a pair of differential output signals DOUT T and DOUT_C may constitute a transmission lane. Although one transmission lane and one receiving lane are illustrated in FIG. 13, the number of transmission lanes and the number of receiving lanes may be changed.

The receiving lane and the transmission lane may transmit data based on a serial communication scheme. Full-duplex communications between the UFS host 1100 and the UFS device 1200 may be enabled due to a structure in which the receiving lane is separated from the transmission lane. That is, while receiving data from the UFS host 1100 through the receiving lane, the UFS device 1200 may transmit data to the UFS host 1100 through the transmission lane. In addition, control data (e.g., a command) from the UFS host 1100 to the UFS device 1200 and user data to be stored in or read from the NVM 1220 of the UFS device 1200 by the UFS host 1100 may be transmitted through the same lane. Accordingly, between the UFS host 1100 and the UFS device 1200, there may be no need to further provide a separate lane for data transmission in addition to a pair of receiving lanes and a pair of transmission lanes.

The UFS device controller 1210 of the UFS device 1200 may control all operations of the UFS device 1200. The UFS device controller 1210 may manage the NVM 1220 by using a logical unit (LU) 1211, which is a logical data storage unit. The number of LUs 1211 may be 8, without being limited thereto. The UFS device controller 1210 may include an FTL and convert a logical data address (e.g., a logical block address (LBA)) received from the UFS host 1100 into a physical data address (e.g., a physical block address (PBA)) by using address mapping information of the FTL. A logical block configured to store user data in the UFS system 1000 may have a size in a predetermined, or alternatively, desired range. For example, a minimum size of the logical block may be set to 4 Kbyte.

When a command from the UFS host 1100 is applied through the UIC layer 1250 to the UFS device 1200, the UFS device controller 1210 may perform an operation in response to the command and transmit a completion response to the UFS host 1100 when the operation is completed.

As an example, when the UFS host 1100 intends to store user data in the UFS device 1200, the UFS host 1100 may transmit a data storage command to the UFS device 1200. When a response (a 'ready-to-transfer' response) indicating that the UFS host 1100 is ready to receive user data (ready-to-transfer) is received from the UFS device 1200, the UFS host 1100 may transmit user data to the UFS device 1200. The UFS device controller 1210 may temporarily store the received user data in the device memory 1240 and store the user data, which is temporarily stored in the device memory 1240, at a selected position of the NVM 1220 based on the address mapping information of the FTL.

As another example, when the UFS host 1100 intends to read the user data stored in the UFS device 1200, the UFS host 1100 may transmit a data read command to the UFS device 1200. The UFS device controller 1210, which has received the command, may read the user data from the NVM 1220 based on the data read command and temporarily store the read user data in the device memory 1240. During the read operation, the UFS device controller 1210 may detect and correct an error in the read user data by using an ECC engine (not shown) embedded therein. For example, the ECC engine may generate parity bits for write data to be written to the NVM 1220, and the generated parity bits may be stored in the NVM 1220 along with the write data. During the reading of data from the NVM 1220, the ECC engine may correct an error in read data by using the parity bits read from the NVM 1220 along with the read data, and output error-corrected read data.

In addition, the UFS device controller 1210 may transmit user data, which is temporarily stored in the device memory 1240, to the UFS host 1100. In addition, the UFS device controller 1210 may further include an AES engine (not shown). The AES engine may perform at least of an encryption operation and a decryption operation on data transmitted to the UFS device controller 1210 by using a symmetric-key algorithm.

The UFS host 1100 may sequentially store commands, which are to be transmitted to the UFS device 1200, in the UFS host register 1111, which may serve as a common queue, and sequentially transmit the commands to the UFS device 1200. In an example embodiment, even while a previously transmitted command is still being processed by the UFS device 1200, that is, even before receiving a notification that the previously transmitted command has been processed by the UFS device 1200, the UFS host 1100 may transmit a next command, which is on standby in the CQ, to the UFS device 1200. Thus, the UFS device 1200 may also receive a next command from the UFS host 1100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 1221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 1200. The voltage VCC may be a main power supply voltage for the UFS device 1200 and be in a range of 2.4 V to 3.6 V. The voltage VCCQ may be a power supply voltage for supplying a low voltage mainly to the UFS device controller 1210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 1251, and be in a range of 1.7 V to 1.95 V. The power supply voltages may be supplied through the regulator 1260 to respective components of the UFS device 1200. The regulator 1260 may be implemented as a set of unit regulators respectively connected to different ones of the power supply voltages described above.

Figure 14A:
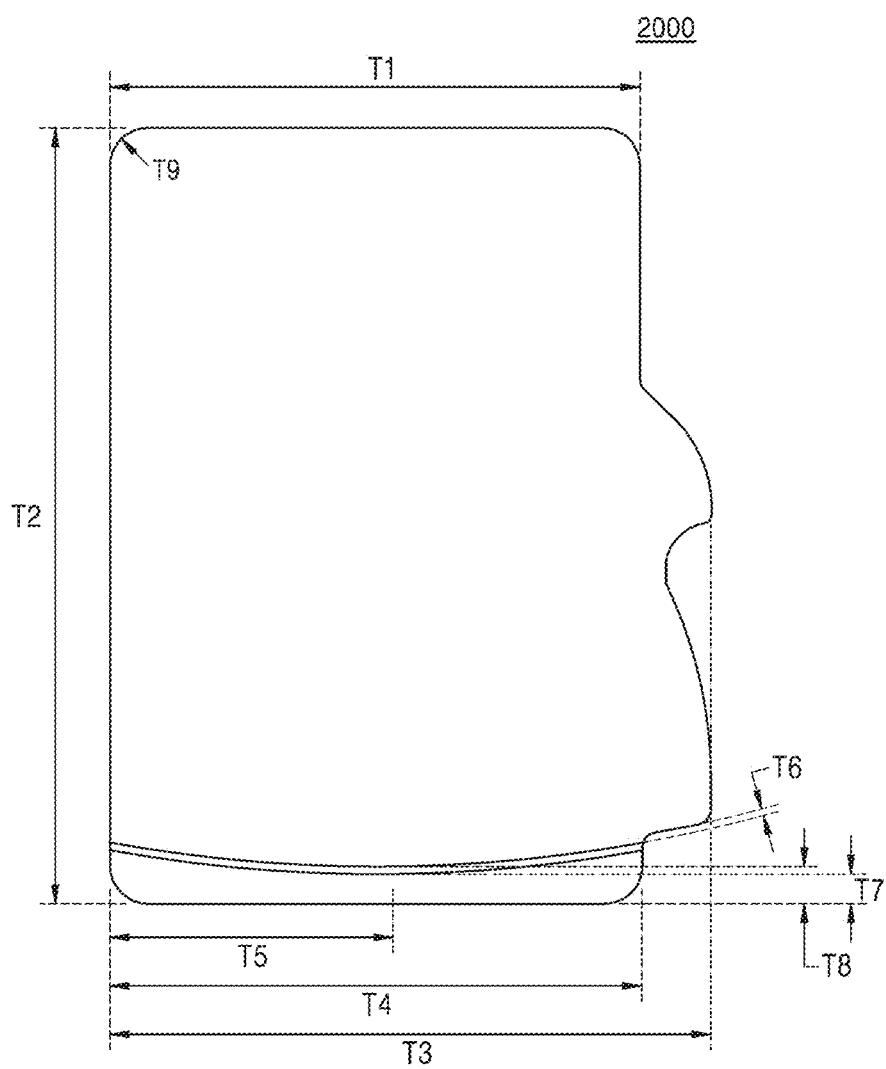
FIGS. 14A to 14C are diagrams of a form factor of a UFS card.
Figure 14B:
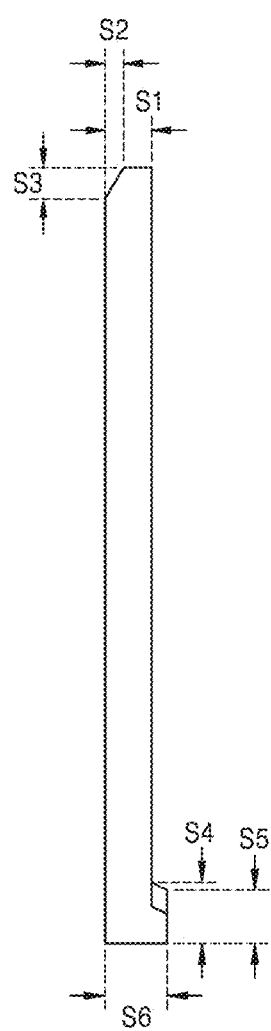
Figure 14C:
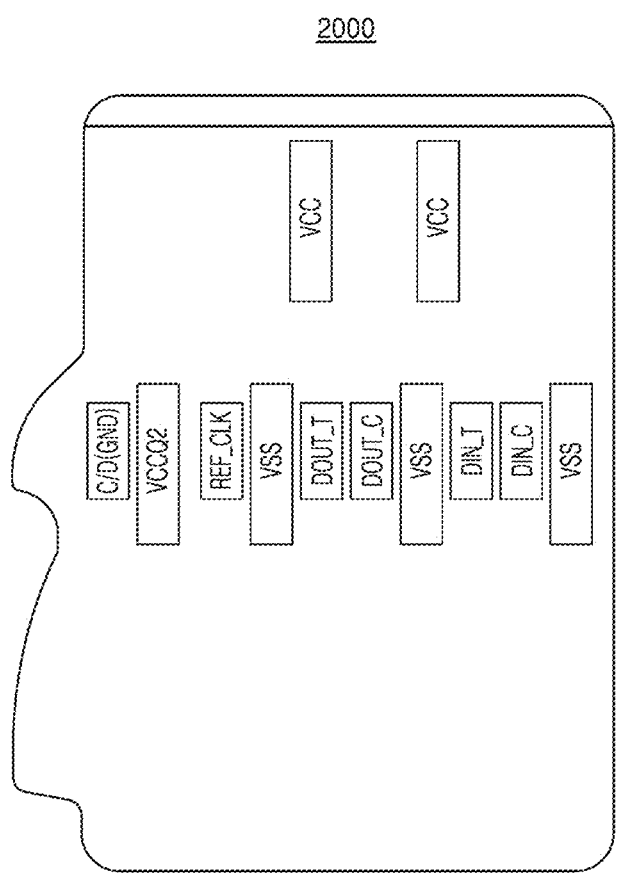

FIGS. 14A to 14C are diagrams of a form factor of a UFS card 2000. When the UFS device 1200 described with reference to FIG. 13 is implemented as the UFS card 2000, an outer appearance of the UFS card 2000 may be as shown in FIGS. 14A to 14C.

FIG. 14A is a top view of the UFS card 2000, according to an example embodiment. Referring to FIG. 14A, it can be seen that the UFS card 2000 entirely follows a shark-shaped design. In FIG. 14A, the UFS card 2000 may have dimensions shown in Table 1 below as an example.

TABLE 1

| Item | Dimension (mm) |
| --- | --- |
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 14B is a side view of the UFS card 2000, according to an example embodiment. In FIG. 14B, the UFS card 2000 may have dimensions shown in Table 2 below as an example.

TABLE 2

| Item | Dimension (mm) |
| --- | --- |
| S1 | 0.74 ± 0.06 |
| S2 | 0.30 |
| S3 | 0.52 |
| S4 | 1.20 |
| S5 | 1.05 |
| S6 | 1.00 |

FIG. 14C is a bottom view of the UFS card 2000, according to an example embodiment. Referring to FIG. 14C, a plurality of pins for electrical contact with a UFS slot may be formed on a bottom surface of the UFS card 2000. Functions of each of the pins will be described below. Based on symmetry between a top surface and the bottom surface of the UFS card 2000, some pieces (e.g., T1 to T5 and T9) of information about the dimensions described with reference to FIG. 14A and Table 1 may also be applied to the bottom view of the UFS card 2000, which is shown in FIG. 14C.

A plurality of pins for an electrical connection with a UFS host may be formed on the bottom surface of the UFS card 2000. Referring to FIG. 6C, a total number of pins may be 12. Each of the pins may have a rectangular shape, and signal names corresponding to the pins may be as shown in FIG. 14C. Specific information about each of the pins will be understood with reference to Table 3 below and the above description presented with reference to FIG. 13.

TABLE 3

| No. | Signal Name | Description | Dimension (mm) |
| --- | --- | --- | --- |
| 1 | Vss | Ground (GND) | 3.00 × 0.72 ± 0.05 |
| 2 | DIN_C | Differential input signals input from a host to the UFS card 4000 (DIN_C is a negative node, and DIN_T is a positive node) | 1.50 × 0.72 ± 0.05 |
| 3 | DIN_T | | |
| 4 | Vss | Ground (GND) | 3.00 × 0.72 ± 0.05 |
| 5 | DOUT_C | Differential output signals output from the UFS card 4000 to the host (DOUT_C is a negative node, and DOUT_T is a positive node) | 1.50 × 0.72 ± 0.05 |
| 6 | DOUT_T | | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |

TABLE 3-continued

| No. | Signal Name | Description | Dimension (mm) |
|---|---|---|---|
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 15:
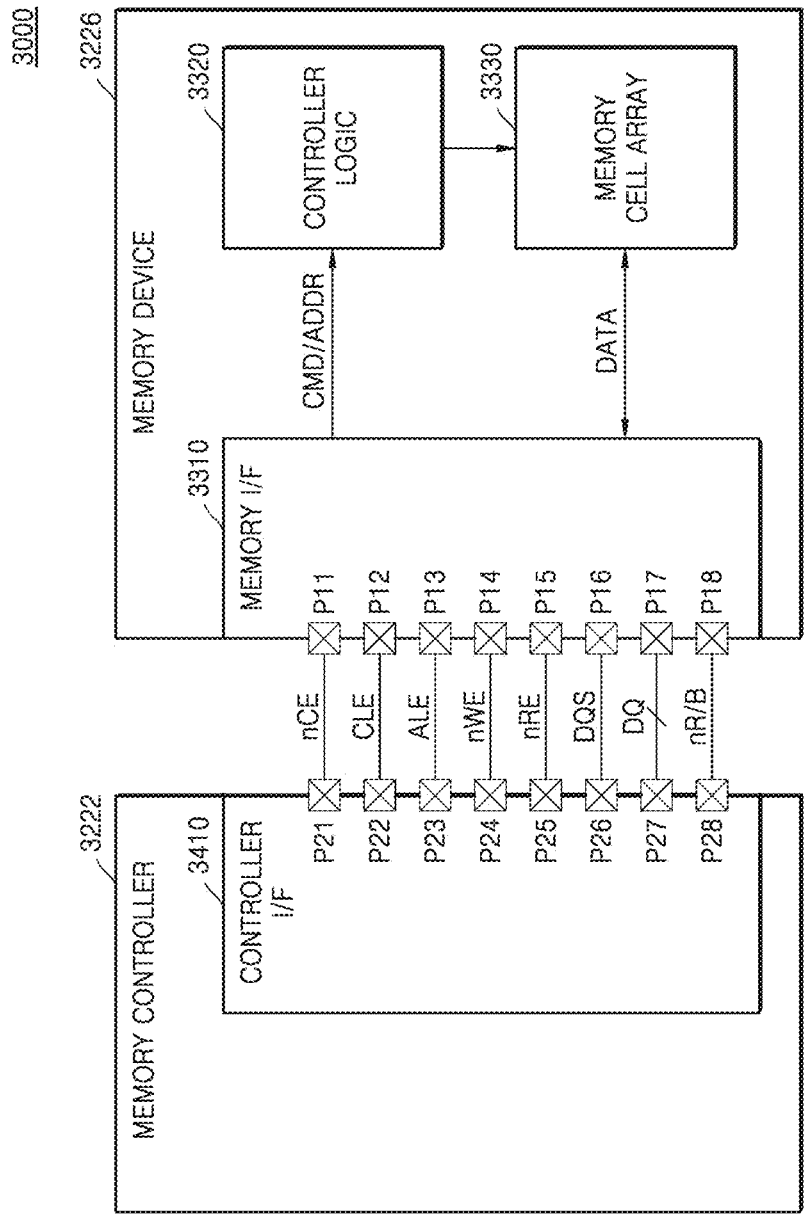
FIG. 15 is a block diagram of a memory system according to an example embodiment of the inventive concepts.

FIG. 15 is a block diagram of a memory system 3000 according to an embodiment of the inventive concepts. Referring to FIG. 15, the memory system 3000 may include a memory device 3200 and a memory controller 3100. The memory device 3200 may correspond to one of NVM devices NVM11 to NVMmn, which communicate with a memory controller 3100 based on one of the plurality of channels CH1 to CHm of FIG. 1. The memory controller 3100 may correspond to the memory controller 120 of FIG. 1.

The memory device 3200 may include first to eighth pins P11 to P18, a memory interface circuitry 3210, a control logic circuitry 3220, and/or a memory cell array 3230.

The memory interface circuitry 3210 may receive a chip enable signal nCE from the memory controller 3100 through the first pin P11. The memory interface circuitry 3210 may transmit and receive signals to and from the memory controller 3100 through the second to eighth pins P12 to P18 in response to the chip enable signal nCE. For example, when the chip enable signal nCE is in an enable state (e.g., a low level), the memory interface circuitry 3210 may transmit and receive signals to and from the memory controller 3100 through the second to eighth pins P12 to P18.

The memory interface circuitry 3210 may receive a command latch enable signal CLE, an address latch enable signal ALE, and a write enable signal nWE from the memory controller 3100 through the second to fourth pins P12 to P14. The memory interface circuitry 3210 may receive a data signal DQ from the memory controller 3100 through the seventh pin P17 or transmit the data signal DQ to the memory controller 3100. A command CMD, an address ADDR, and data may be transmitted via the data signal DQ. For example, the data signal DQ may be transmitted through a plurality of data signal lines. In an example embodiment, the seventh pin P17 may include a plurality of pins corresponding to a plurality of data signals DQ(s), respectively.

The memory interface circuitry 3210 may obtain the command CMD from the data signal DQ, which is received in an enable section (e.g., a high-level state) of the command latch enable signal CLE based on toggle time points of the write enable signal nWE. The memory interface circuitry 3210 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 3210 may obtain the command CMD or the address ADDR based on toggle time points of the write enable signal nWE.

The memory interface circuitry 3210 may receive a read enable signal nRE from the memory controller 3100 through the fifth pin P15. The memory interface circuitry 3210 may receive a data strobe signal DQS from the memory controller 3100 through the sixth pin P16 or transmit the data strobe signal DQS to the memory controller 3100.

In a data (DATA) output operation of the memory device 3200, the memory interface circuitry 3210 may receive the read enable signal nRE, which toggles through the fifth pin P15, before outputting the data DATA. The memory interface circuitry 3210 may generate the data strobe signal DQS, which toggles based on the toggling of the read enable signal nRE. For example, the memory interface circuitry 3210 may generate a data strobe signal DQS, which starts toggling after a predetermined, or alternatively, desired delay (e.g., tDQSRE), based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 3100.

In a data (DATA) input operation of the memory device 3200, when the data signal DQ including the data DATA is received from the memory controller 3100, the memory interface circuitry 3210 may receive the data strobe signal DQS, which toggles, along with the data DATA from the memory controller 3100. The memory interface circuitry 3210 may obtain the data DATA from the data signal DQ based on toggle time points of the data strobe signal DQS. For example, the memory interface circuitry 3210 may sample the data signal DQ at rising and falling edges of the data strobe signal DQS and obtain the data DATA.

The memory interface circuitry 3210 may transmit a ready/busy output signal nR/B to the memory controller 3100 through the eighth pin P18. The memory interface circuitry 3210 may transmit state information of the memory device 3200 through the ready/busy output signal nR/B to the memory controller 3100. When the memory device 3200 is in a busy state (e.g., when operations are being performed in the memory device 3200), the memory interface circuitry 3210 may transmit a ready/busy output signal nR/B indicating the busy state to the memory controller 3100. When the memory device 3200 is in a ready state (i.e., when operations are not performed or completed in the memory device 3200), the memory interface circuitry 3210 may transmit a ready/busy output signal nR/B indicating the ready state to the memory controller 3100. For example, while the memory device 3200 is reading data DATA from the memory cell array 3230 in response to a page read command, the memory interface circuitry 3210 may transmit a ready/busy output signal nR/B indicating a busy state (e.g., a low level) to the memory controller 3100. For example, while the memory device 3200 is programming data DATA to the memory cell array 3230 in response to a program command, the memory interface circuitry 3210 may transmit a ready/busy output signal nR/B indicating the busy state to the memory controller 400.

The control logic circuitry 3220 may control all operations of the memory device 3200. The control logic circuitry 3220 may receive the command/address CMD/ADDR obtained from the memory interface circuitry 3210. The control logic circuitry 3220 may generate control signals for controlling other components of the memory device 3200 in response to the received command/address CMD/ADDR. For example, the control logic circuitry 3220 may generate various control signals for programming data DATA to the memory cell array 3230 or reading the data DATA from the memory cell array 3230.

The memory cell array 3230 may store the data DATA obtained from the memory interface circuitry 3210, via the control of the control logic circuitry 3220. The memory cell array 3230 may output the stored data DATA to the memory interface circuitry 3210 via the control of the control logic circuitry 3220.

The memory cell array 3230 may include a plurality of memory cells. For example, the plurality of memory cells may be flash memory cells. However, the inventive concepts are not limited thereto, and the memory cells may be RRAM cells, FRAM cells, PRAM cells, thyristor RAM (TRAM) cells, or MRAM cells. Hereinafter, an example embodiment in which the memory cells are NAND flash memory cells will mainly be described.

The memory controller 3100 may include first to eighth pins P21 to P28 and a controller interface circuitry 3110. The first to eighth pins P21 to P28 may correspond to the first to eighth pins P11 to P18 of the memory device 3200, respectively.

The controller interface circuitry 3110 may transmit a chip enable signal nCE to the memory device 3200 through the first pin P21. The controller interface circuitry 3110 may transmit and receive signals to and from the memory device 3200, which is selected by the chip enable signal nCE, through the second to eighth pins P22 to P28.

The controller interface circuitry 3110 may transmit the command latch enable signal CLE, the address latch enable signal ALE, and the write enable signal nWE to the memory device 3200 through the second to fourth pins P22 to P24. The controller interface circuitry 3110 may transmit or receive the data signal DQ to and from the memory device 3200 through the seventh pin P27.

The controller interface circuitry 3110 may transmit the data signal DQ including the command CMD or the address ADDR to the memory device 3200 along with the write enable signal nWE, which toggles. The controller interface circuitry 3110 may transmit the data signal DQ including the command CMD to the memory device 3200 by transmitting a command latch enable signal CLE having an enable state. Also, the controller interface circuitry 3110 may transmit the data signal DQ including the address ADDR to the memory device 3200 by transmitting an address latch enable signal ALE having an enable state.

The controller interface circuitry 3110 may transmit the read enable signal nRE to the memory device 3200 through the fifth pin P25. The controller interface circuitry 3110 may receive or transmit the data strobe signal DQS from or to the memory device 3200 through the sixth pin P26.

In a data (DATA) output operation of the memory device 3200, the controller interface circuitry 3110 may generate a read enable signal nRE, which toggles, and transmit the read enable signal nRE to the memory device 3200. For example, before outputting data DATA, the controller interface circuitry 3110 may generate a read enable signal nRE, which is changed from a static state (e.g., a high level or a low level) to a toggling state. Thus, the memory device 3200 may generate a data strobe signal DQS, which toggles, based on the read enable signal nRE. The controller interface circuitry 3110 may receive the data signal DQ including the data DATA along with the data strobe signal DQS, which toggles, from the memory device 3200. The controller interface circuitry 3110 may obtain the data DATA from the data signal DQ based on a toggle time point of the data strobe signal DQS.

In a data (DATA) input operation of the memory device 3200, the controller interface circuitry 3110 may generate a data strobe signal DQS, which toggles. For example, before transmitting data DATA, the controller interface circuitry 3110 may generate a data strobe signal DQS, which is changed from a static state (e.g., a high level or a low level) to a toggling state. The controller interface circuitry 3110 may transmit the data signal DQ including the data DATA to the memory device 3200 based on toggle time points of the data strobe signal DQS.

The controller interface circuitry 3110 may receive a ready/busy output signal nR/B from the memory device 3200 through the eighth pin P28. The controller interface circuitry 3110 may determine state information of the memory device 3200 based on the ready/busy output signal nR/B.

Figure 16:
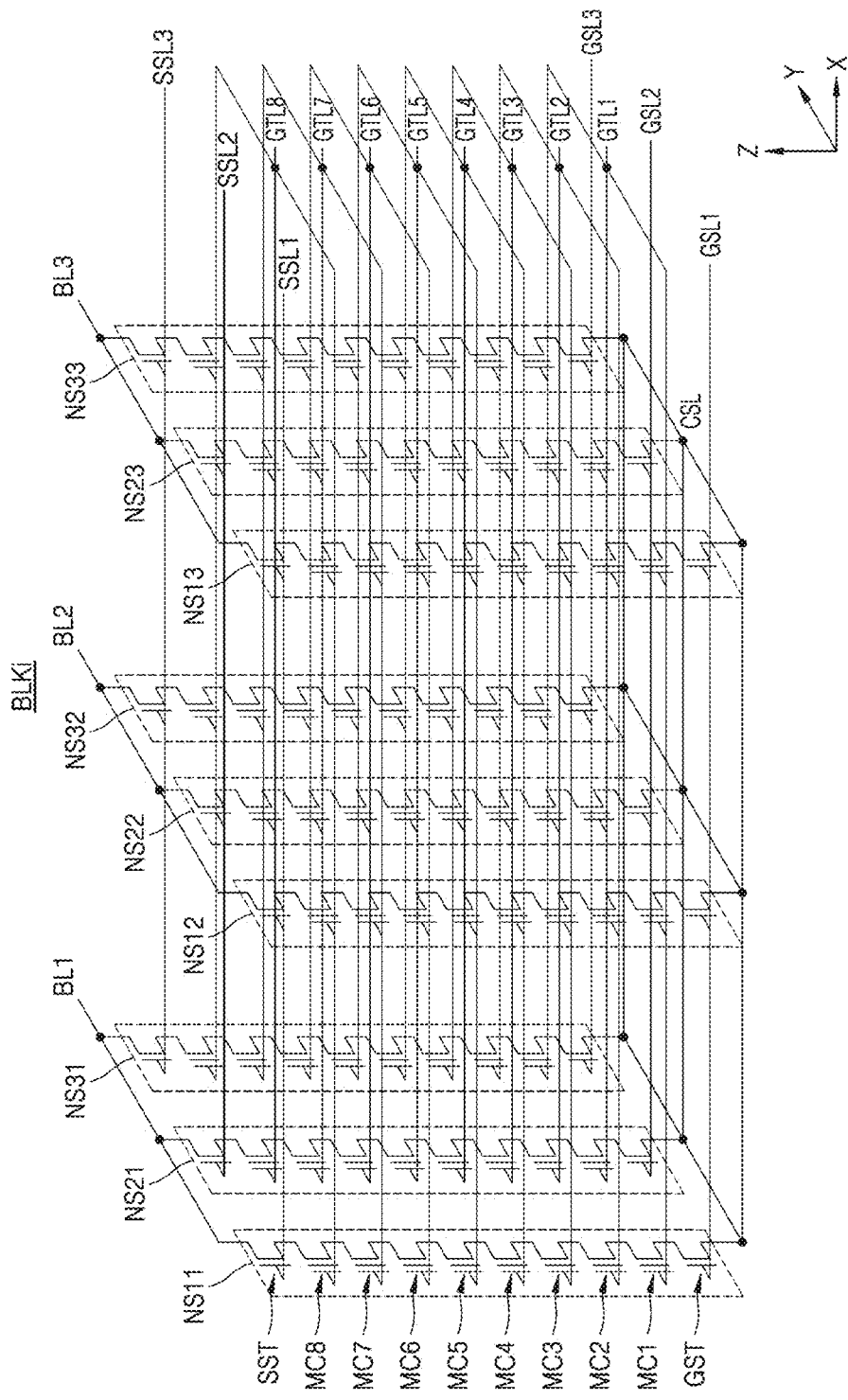
FIG. 16 is a diagram of a 3D V-NAND structure applicable to a UFS device according to an example embodiment of the inventive concepts.

FIG. 16 is a diagram of a 3D V-NAND structure applicable to a UFS device according to an example embodiment. When a storage module of the UFS device is implemented as a 3D V-NAND flash memory, each of a plurality of memory blocks included in the storage module may be represented by an equivalent circuit shown in FIG. 16.

A memory block BLKi shown in FIG. 16 may refer to a 3D memory block having a 3D structure formed on a substrate. For example, a plurality of memory NAND strings included in the memory block BLKi may be formed in a vertical direction to the substrate.

Referring to FIG. 16, the memory block BLKi may include a plurality of memory NAND strings (e.g., NS11 to NS33), which are connected between bit lines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 16, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may correspond to word lines, respectively, and some of the gate lines GTL1, GTL2, . . . , and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 16 illustrates an example embodiment in which a memory block BLK is connected to eight gate lines GTL1, GTL2, . . . , and GTL8 and three bit lines BL1, BL2, and BL3, without being limited thereto.

Figure 17:
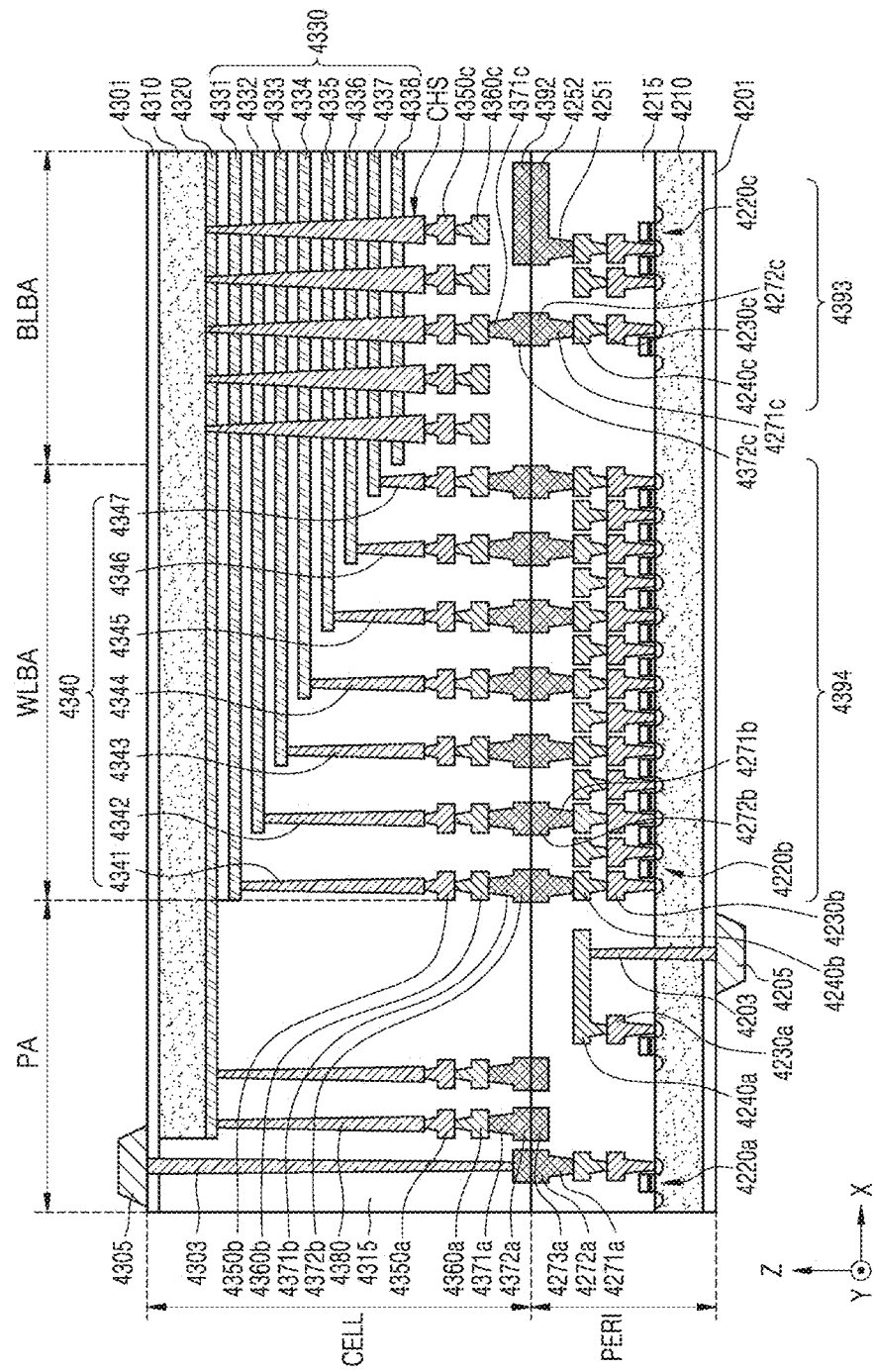
FIG. 17 is a diagram illustrating a memory device according to another example embodiment of the inventive concepts.

FIG. 17 is a diagram illustrating a memory device 4000 according to another example embodiment.

Referring to FIG. 17, a memory device 4000 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. In an example embodiment, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the memory device 4000 may include an external pad bonding area PA, a word line bonding area WLBA, and/or a bit line bonding area BLBA.

The peripheral circuit region PERI may include a first substrate 4110, an interlayer insulating layer 4115, a plurality of circuit elements 4120a, 4120b, and 4120c formed on the first substrate 4110, first metal layers 4130a, 4130b, and 4130c respectively connected to the plurality of circuit elements 4120a, 4120b, and 4120c, and/or second metal layers 4140a, 4140b, and 4140c formed on the first metal layers 4130a, 4130b, and 4130c. In an example embodiment, the first metal layers 4130a, 4130b, and 4130c may be formed of tungsten having relatively high electrical resistivity, and the second metal layers 4140a, 4140b, and 4140c may be formed of copper having relatively low electrical resistivity.

In an example embodiment illustrate in FIG. 17, although only the first metal layers 4130a, 4130b, and 4130c and the second metal layers 4140a, 4140b, and 4140c are shown and described, example embodiments are not limited thereto, and one or more additional metal layers may be further formed on the second metal layers 4140a, 4140b, and 4140c. At least a portion of the one or more additional metal layers formed on the second metal layers 4140a, 4140b, and 4140c may be formed of aluminum or the like having a lower electrical resistivity than those of copper forming the second metal layers 4140a, 4140b, and 4140c.

The interlayer insulating layer 4115 may be disposed on the first substrate 4110 and cover the plurality of circuit elements 4120a, 4120b, and 4120c, the first metal layers 4130a, 4130b, and 4130c, and the second metal layers 4140a, 4140b, and 4140c. The interlayer insulating layer 4115 may include an insulating material such as silicon oxide, silicon nitride, or the like.

Lower bonding metals 4171b and 4172b may be formed on the second metal layer 4140b in the word line bonding area WLBA. In the word line bonding area WLBA, the lower bonding metals 4171b and 4172b in the peripheral circuit region PERI may be electrically bonded to upper bonding metals 4271b and 4272b of the cell region CELL. The lower bonding metals 4171b and 4172b and the upper bonding metals 4271b and 4272b may be formed of aluminum, copper, tungsten, or the like. Further, the upper bonding metals 4271b and 4272b in the cell region CELL may be referred as first metal pads and the lower bonding metals 4171b and 4172b in the peripheral circuit region PERI may be referred as second metal pads.

The cell region CELL may include at least one memory block. The cell region CELL may include a second substrate 4210 and a common source line 4220. On the second substrate 4210, a plurality of word lines 4231 to 4238 (e.g., 4230) may be stacked in a direction (a Z-axis direction), perpendicular to an upper surface of the second substrate 4210. At least one string select line and at least one ground select line may be arranged on and below the plurality of word lines 4230, respectively, and the plurality of word lines 4230 may be disposed between the at least one string select line and the at least one ground select line.

In the bit line bonding area BLBA, a channel structure CH may extend in a direction(a Z-axis direction), perpendicular to the upper surface of the second substrate 4210, and pass through the plurality of word lines 4230, the at least one string select line, and the at least one ground select line. The channel structure CH may include a data storage layer, a channel layer, a buried insulating layer, and the like, and the channel layer may be electrically connected to a first metal layer 4250c and a second metal layer 4260c. For example, the first metal layer 4250c may be a bit line contact, and the second metal layer 4260c may be a bit line. In an example embodiment, the bit line 4260c may extend in a first direction (a Y-axis direction), parallel to the upper surface of the second substrate 4210.

In an example embodiment illustrated in FIG. 17, an area in which the channel structure CH, the bit line 4260c, and the like are disposed may be defined as the bit line bonding area BLBA. In the bit line bonding area BLBA, the bit line 4260c may be electrically connected to the circuit elements 4120c providing a page buffer 4293 in the peripheral circuit region PERI. The bit line 4260c may be connected to upper bonding metals 4271c and 4272c in the cell region CELL, and the upper bonding metals 4271c and 4272c may be connected to lower bonding metals 4171c and 4172c connected to the circuit elements 4120c of the page buffer 4293. In an example embodiment, a program operation may be executed based on a page unit as write data of the page-unit is stored in the page buffer 4293, and a read operation may be executed based on a sub-page unit as read data of the sub-page unit is stored in the page buffer 4293. Also, in the program operation and the read operation, units of data transmitted through bit lines may be different from each other.

In the word line bonding area WLBA, the plurality of word lines 4230 may extend in a second direction (an X-axis direction), parallel to the upper surface of the second substrate 4210 and perpendicular to the first direction, and may be connected to a plurality of cell contact plugs 4241 to 4247 (e.g., 4240). The plurality of word lines 4230 and the plurality of cell contact plugs 4240 may be connected to each other in pads provided by at least a portion of the plurality of word lines 4230 extending in different lengths in the second direction. A first metal layer 4250b and a second metal layer 4260b may be connected to an upper portion of the plurality of cell contact plugs 4240 connected to the plurality of word lines 4230, sequentially. The plurality of cell contact plugs 4240 may be connected to the peripheral circuit region PERI by the upper bonding metals 4271b and 4272b of the cell region CELL and the lower bonding metals 4171b and 4172b of the peripheral circuit region PERI in the word line bonding area WLBA.

The plurality of cell contact plugs 4240 may be electrically connected to the circuit elements 4120b forming a row decoder 4294 in the peripheral circuit region PERI. In an example embodiment, operating voltages of the circuit elements 4120b of the row decoder 4294 may be different than operating voltages of the circuit elements 4120c forming the page buffer 4293. For example, operating voltages of the circuit elements 4120c forming the page buffer 4293 may be greater than operating voltages of the circuit elements 4120b forming the row decoder 4294.

A common source line contact plug 4280 may be disposed in the external pad bonding area PA. The common source line contact plug 4280 may be formed of a conductive material such as a metal, a metal compound, polysilicon, or the like, and may be electrically connected to the common source line 4220. A first metal layer 4250a and a second metal layer 4260a may be stacked on an upper portion of the common source line contact plug 4280, sequentially. For example, an area in which the common source line contact plug 4280, the first metal layer 4250a, and the second metal layer 4260a are disposed may be defined as the external pad bonding area PA.

Input-output pads 4105 and 4205 may be disposed in the external pad bonding area PA. Referring to FIG. 17, a lower insulating film 4101 covering a lower surface of the first substrate 4110 may be formed below the first substrate 4110, and a first input-output pad 4105 may be formed on the lower insulating film 4101. The first input-output pad 4105 may be connected to at least one of the plurality of circuit elements 4120a, 4120b, and 4120c disposed in the peripheral circuit region PERI through a first input-output contact plug 4103, and may be separated from the first substrate 4110 by the lower insulating film 4101. In addition, a side insulating film may be disposed between the first input-output contact plug 4103 and the first substrate 4110 to electrically separate the first input-output contact plug 4103 and the first substrate 4110.

Referring to FIG. 17, an upper insulating film 4201 covering the upper surface of the second substrate 4210 may be formed on the second substrate 4210, and a second input-output pad 4205 may be disposed on the upper insulating layer 4201. The second input-output pad 4205 may be connected to at least one of the plurality of circuit elements 4120a, 4120b, and 4120c disposed in the peripheral circuit region PERI through a second input-output contact plug 4203. In the example embodiment, the second input-output pad 4205 is electrically connected to a circuit element 4120a.

According to embodiments, the second substrate 4210 and the common source line 4220 may not be disposed in an area in which the second input-output contact plug 4203 is disposed. Also, the second input-output pad 4205 may not overlap the word lines 4230 in the third direction (the Z-axis direction). Referring to FIG. 17, the second input-output contact plug 303 may be separated from the second substrate 4210 in a direction, parallel to the upper surface of the second substrate 4210, and may pass through the interlayer insulating layer 4215 of the cell region CELL to be connected to the second input-output pad 4205.

According to embodiments, the first input-output pad 4105 and the second input-output pad 4205 may be selectively formed. For example, the memory device 600 may include only the first input-output pad 4105 disposed on the first substrate 4110 or the second input-output pad 4205 disposed on the second substrate 4210. Alternatively, the memory device 600 may include both the first input-output pad 4105 and the second input-output pad 4205.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 4173a, corresponding to an upper metal pattern 4272a formed in an uppermost metal layer of the cell region CELL, and having the same cross-sectional shape as the upper metal pattern 4272a of the cell region CELL so as to be connected to each other, in an uppermost metal layer of the peripheral circuit region PERI. In the peripheral circuit region PERI, the lower metal pattern 4173a formed in the uppermost metal layer of the peripheral circuit region PERI may not be connected to a contact. Similarly, in the external pad bonding area PA, an upper metal pattern 4272a, corresponding to the lower metal pattern 4173a formed in an uppermost metal layer of the peripheral circuit region PERI, and having the same shape as a lower metal pattern 4173a of the peripheral circuit region PERI, may be formed in an uppermost metal layer of the cell region CELL.

The lower bonding metals 4171b and 4172b may be formed on the second metal layer 4140b in the word line bonding area WLBA. In the word line bonding area WLBA, the lower bonding metals 4171b and 4172b of the peripheral circuit region PERI may be electrically connected to the upper bonding metals 4271b and 4272b of the cell region CELL by a Cu-to-Cu bonding.

Further, in the bit line bonding area BLBA, an upper metal pattern 4292, corresponding to a lower metal pattern 4152 formed in the uppermost metal layer of the peripheral circuit region PERI, and having the same cross-sectional shape as the lower metal pattern 4152 of the peripheral circuit region PERI, may be formed in an uppermost metal layer of the cell region CELL. A contact may not be formed on the upper metal pattern 4292 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. A method of operating a storage device, the method comprising:
 receiving a first bit sequence including a request for changing a data rate from a host at a first data rate through an input signal pin;
 sending a second bit sequence including a response to the request for changing a data rate to the host at the first data rate through an output signal pin; and
 changing the data rate to a second data rate according to whether a final bit indicating an end of the second bit sequence is output.

2. The method of claim 1, wherein the changing of the data rate to the second data rate is performed during a time period in which data is not sent to the host.

3. The method of claim 1, wherein the changing of the data rate to the second data rate comprises changing a frequency of an internal clock signal synchronized with data based on a reference clock signal received through a clock signal pin from the host, such that the data rate is changed to the second data rate.

4. The method of claim 1, wherein the changing of the data rate to the second data rate comprises:
receiving a first final bit indicating an end of the first bit sequence;
outputting a second final bit indicating the end of the second bit sequence in response to the first final bit; and
changing the data rate to the second data rate when the second final bit is output.

5. The method of claim 1, further comprising:
receiving a line reset signal from the host through a reset signal pin; and
changing the data rate to a third data rate in response to reception of the line reset signal.

6. The method of claim 5, wherein the third data rate is the first data rate or a default data rate.

7. The method of claim 5, wherein the line reset signal is received before the final bit is output, and
the changing the data rate to the third data rate comprises:
outputting the final bit in response to reception of the line reset signal; and
changing the data rate to the third data rate.

8. The method of claim 1, wherein the storage device is a universal flash storage (UFS) device that is mutually connected to the host through the UFS standard.

9. A method of operating a storage system comprising a host and a storage device, the method comprising:
sending, by the host, a first bit sequence comprising a request to change a data rate to the storage device at a first data rate;
sending, by the storage device, a second bit sequence comprising a response corresponding to the request to change the data rate to the host at the first data rate; and
changing, by the host and the storage device, the data rate based on a final bit indicating an end of the second bit sequence.

10. The method of claim 9, wherein the changing, by the host and the storage device, of the data rate comprises:
changing, by the storage device, the data rate to a second data rate based on whether the final bit is output; and
changing, by the host, the data rate to the second data rate based on whether the final bit is received.

11. The method of claim 9, wherein the changing, by the host and the storage device, of the data rate is performed during a time period in which data is not sent/received by the host and the storage device.

12. The method of claim 10, wherein the changing, by the storage device, of the data rate to the second data rate based on whether the final bit is output comprises
changing a frequency of an internal clock signal synchronized with data by changing a division ratio regarding a reference clock signal received through a clock signal pin from the host, such that data is sent to the host at the second data rate.

13. The method of claim 10, wherein the changing, by the host, of the data rate to the second data rate based on whether the final bit is received comprises
changing a frequency of a reference clock signal, which is a basis of an internal clock signal synchronized with data, such that data is sent to the storage device at the second data rate.

14. The method of claim 10, wherein the changing, by the host, of the data rate to the second data rate based on whether the final bit is received comprises
changing a frequency of an internal clock signal synchronized with data by changing a division ratio regarding a reference clock signal, such that data is sent to the storage device at the second data rate.

15. The method of claim 9, further comprising:
outputting, by the host, a line reset signal through a reset signal pin based on whether a response corresponding to the request for changing the data rate is received; and
changing, by the storage device, the data rate to a third data rate in response to the line reset signal.

16. The method of claim 15, wherein, the outputting, by the host, of the line reset signal through the reset signal pin based on whether a response corresponding to the request for changing the data rate is received comprises:
monitoring, by the host, whether a response corresponding to the request for changing the data rate is received before a timeout has elapsed after the host sends the request for changing the data rate; and
outputting, by the host, the line reset signal when the response is not received.

17. The method of claim 15, wherein the third data rate is the first data rate or a default data rate.

18. A storage device comprising:
a non-volatile memory configured to store data received from a host;
a device controller configured to control the non-volatile memory; and
an interconnect connected to the host through a plurality of pins,
wherein the interconnect is configure to receive a first bit sequence comprising a data rate change request from the host at a first data rate, is configure to send a second bit sequence including a response to the data rate change request to the host at the first data rate, and is configure to change the data rate to a second data rate according to whether final bit indicating an end of the second bit sequence is output.

19. The storage device of claim 18, wherein the interconnect comprises:
a receiver configured to receive data from the host;
a transmitter configured to send data to the host; and
a clock generator configured to generate an internal clock signal driving the receiver and the transmitter based on a reference clock signal received from the host, and
the clock generator is configured to change a frequency of the internal clock signal, such that the data rate is changed to a second data rate.

20. The storage device of claim 18, wherein the interconnect is configure to change the data rate to a third data rate when a line reset signal is received from the host, and
the third data rate is the first data rate or a default data rate.

* * * * *